US 6,558,598 B2

(12) United States Patent
Neter et al.

(10) Patent No.: US 6,558,598 B2
(45) Date of Patent: *May 6, 2003

(54) POST-MOLD COOLING METHOD

(75) Inventors: Witold Neter, Don Mills (CA); Faisal Oueslati, Mississauga (CA); Tiemo Brand, North York (CA); Gordon Elliott, Etobicoke (CA); Richard Unterlander, Holland Landing (CA); Gheorghe Olaru, Toronto (CA)

(73) Assignee: Husky Injection Molding Systems, Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/996,759

(22) Filed: Nov. 30, 2001

(65) Prior Publication Data

US 2002/0074687 A1 Jun. 20, 2002

Related U.S. Application Data

(62) Division of application No. 09/613,947, filed on Jul. 11, 2000, which is a division of application No. 09/119,256, filed on Jul. 20, 1998, now Pat. No. 6,171,541.

(60) Provisional application No. 60/080,085, filed on Mar. 31, 1998.

(51) Int. Cl.[7] .............................................. B29C 45/72
(52) U.S. Cl. .................. 264/237; 264/328.14; 264/336; 264/348
(58) Field of Search ................................ 264/40.6, 237, 264/328.1, 328.14, 328.15, 328.16, 335, 336, 348, 519; 425/143, 547, 548, 526, 534, 556, 444

(56) References Cited

U.S. PATENT DOCUMENTS

| | | | |
|---|---|---|---|
| 3,822,213 A | 7/1974 | Johnson et al. ............. 252/162 |
| 4,356,142 A | 10/1982 | Germanio .................... 264/537 |
| 4,382,905 A | 5/1983 | Valyi .......................... 264/520 |
| 4,592,719 A | 6/1986 | Bellehache et al. ......... 425/526 |
| 4,721,452 A | 1/1988 | Delfer, III ................... 425/547 |
| RE33,237 E | 6/1990 | Delfer, III ................... 425/547 |
| 5,052,626 A | 10/1991 | Wood et al. ................. 239/567 |
| 5,114,327 A | 5/1992 | Williamson et al. ........ 425/139 |
| 5,139,724 A | 8/1992 | Hofstetter et al. .......... 264/101 |
| 5,176,871 A | 1/1993 | Fukai .......................... 264/348 |
| 5,230,840 A | 7/1993 | Nishiguchi et al. .......... 264/1.5 |
| 5,232,641 A | 8/1993 | Williamson et al. ....... 264/40.6 |
| 5,232,715 A | 8/1993 | Fukai .......................... 425/526 |
| 5,338,172 A | 8/1994 | Williamson et al. ........ 425/143 |
| 5,447,426 A | 9/1995 | Gessner et al. ............. 425/436 |
| 5,514,309 A | 5/1996 | Williamson et al. .......... 264/37 |
| 5,582,788 A | 12/1996 | Collette et al. ........... 264/297.2 |
| 5,653,934 A * | 8/1997 | Brun, Jr. et al. ............. 264/334 |
| 5,702,734 A | 12/1997 | Hartman et al. ............. 425/534 |
| 5,707,662 A | 1/1998 | Bright et al. ................ 425/547 |
| 5,869,110 A | 2/1999 | Ogihara ....................... 425/526 |
| 6,171,541 B1 * | 1/2001 | Neter et al. ............. 264/328.14 |
| 6,223,541 B1 * | 5/2001 | Farrag .......................... 425/526 |
| 6,299,431 B1 * | 10/2001 | Neter .......................... 264/348 |
| 6,299,804 B1 * | 10/2001 | Domodossola et al. ..... 239/431 |

FOREIGN PATENT DOCUMENTS

| EP | 0 937 566 A1 | 10/1998 | ........... B29C/45/72 |
|---|---|---|---|
| JP | 7-171888 | 7/1995 | ........... B29C/49/64 |
| JP | 8-103948 | 4/1996 | ........... B29C/49/64 |

* cited by examiner

*Primary Examiner*—Jill L. Heitbrink
(74) *Attorney, Agent, or Firm*—Katten Muchin Zavis Rosenman

(57) ABSTRACT

The present invention relates to an improved method and apparatus for injection molding and cooling molded articles such as preforms so as to avoid crystallinity. The apparatus and method make use of a take-off plate for removing articles from a mold, which plate may include heat transfer devices for cooling exterior surfaces of the molded articles or preforms, and a system for cooling in a controlled manner interior surfaces of the molded articles or preforms.

39 Claims, 20 Drawing Sheets

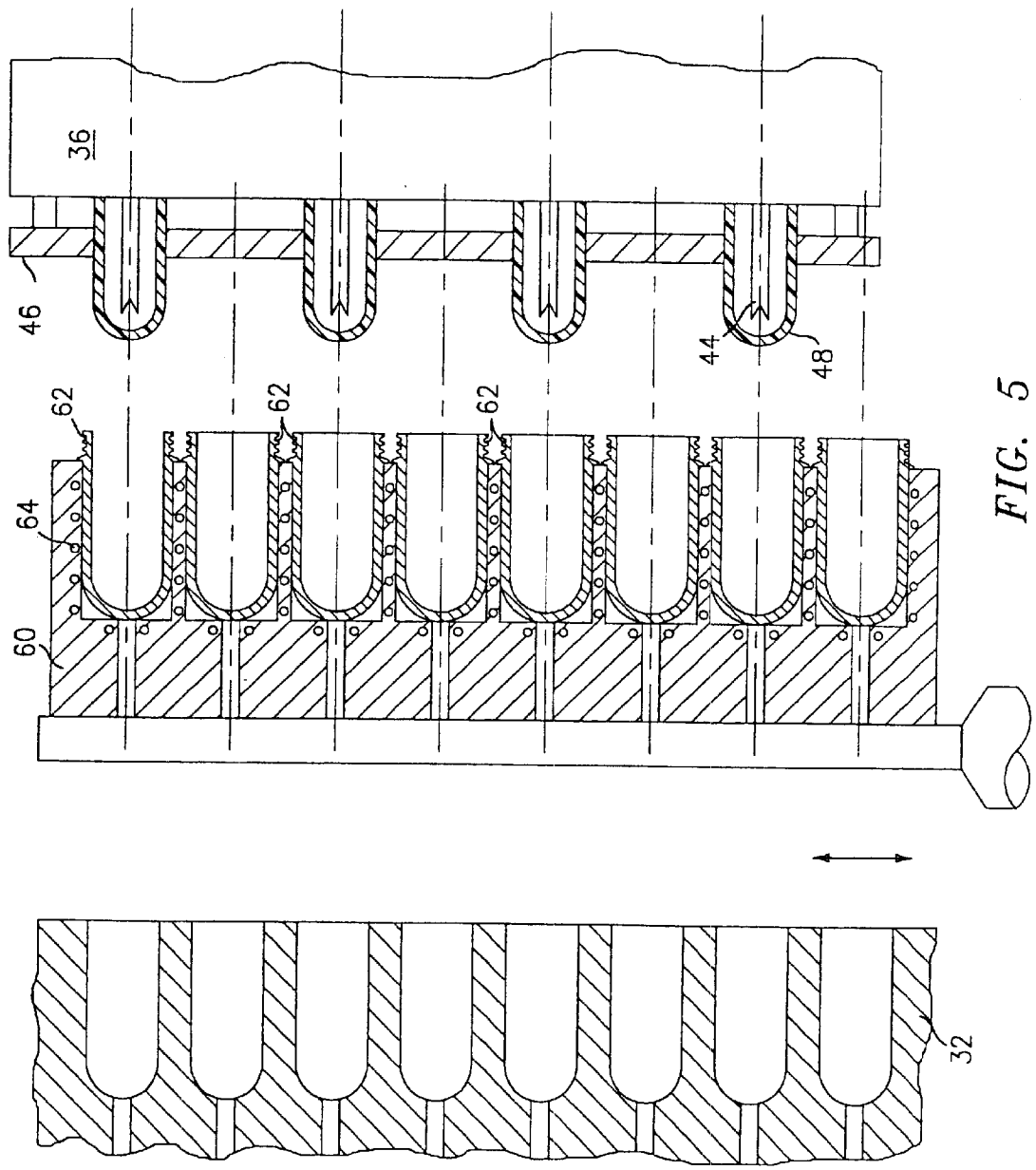

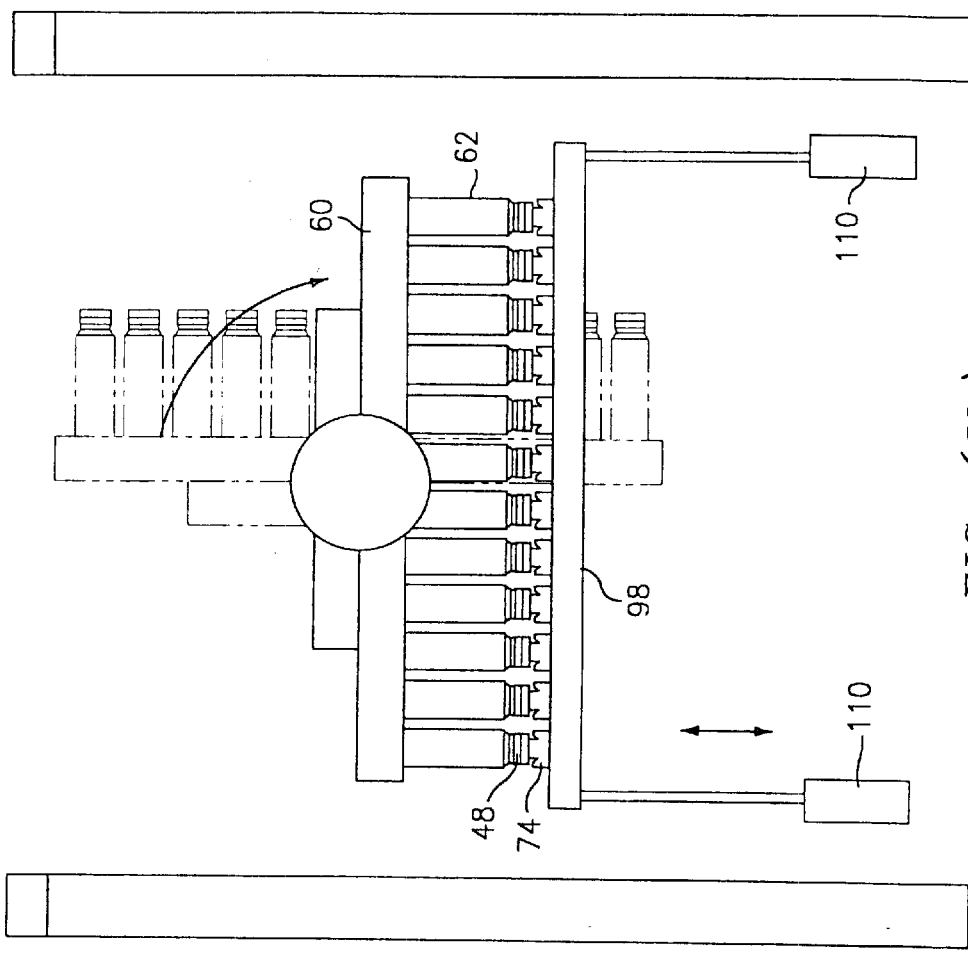
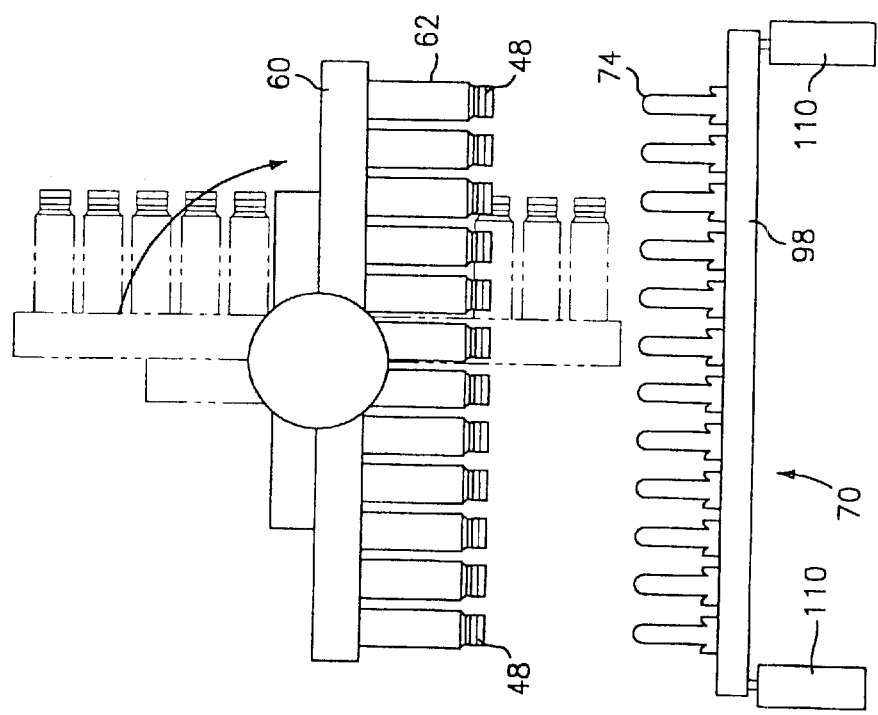
FIG. (6b)
FIG. (6a)

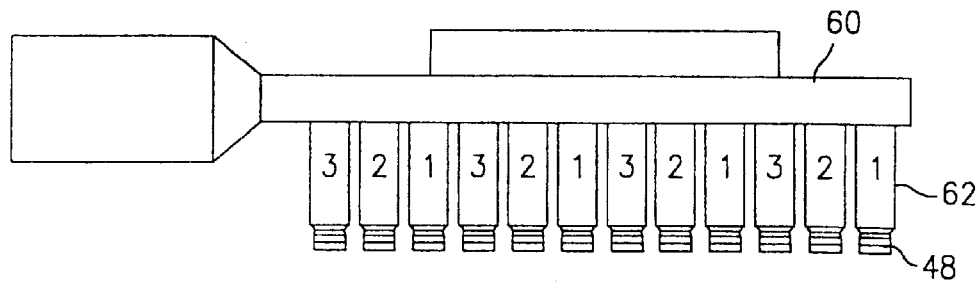
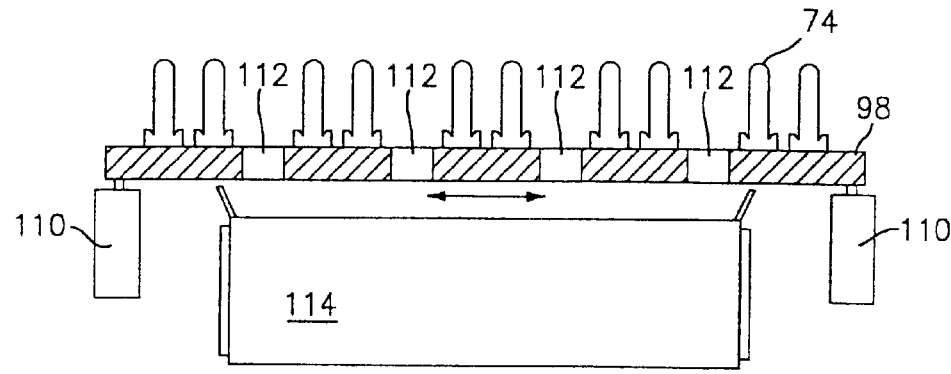
FIG. 6(c)
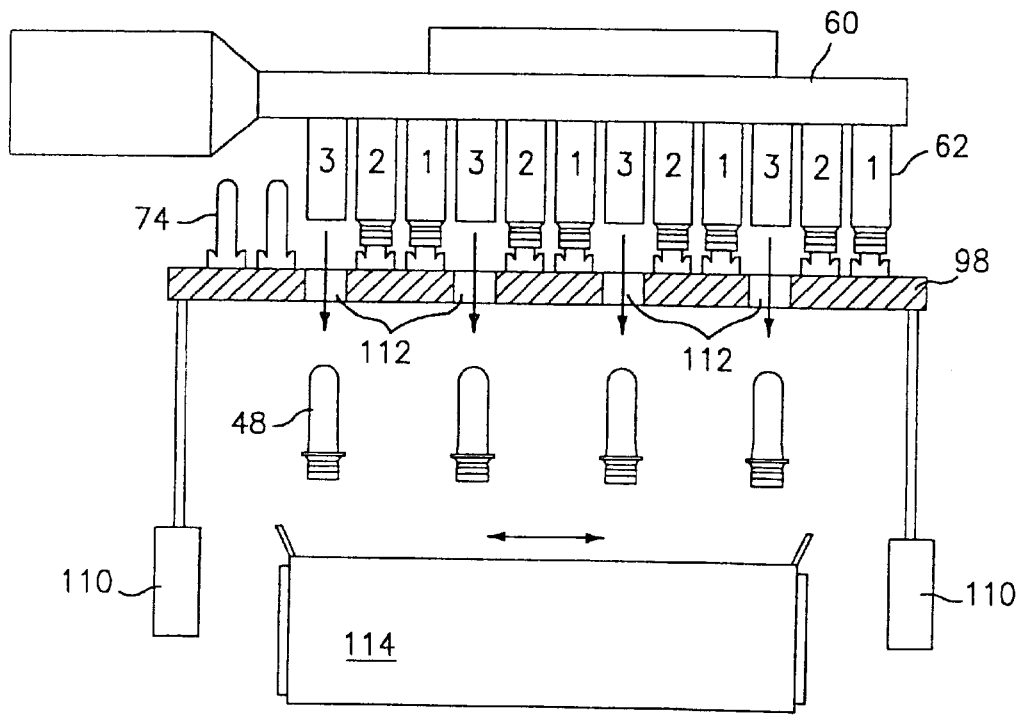
FIG. 6(d)

POST-MOLD COOLING METHOD

CROSS-REFERENCE TO RELATED APPLICATION

This application is a Divisional application of U.S. patent application Ser. No. 09/613,947, filed Jul. 11, 2000, incorporated herein by reference, which is a Divisional application of 09/119,256, filed Jul. 20, 1998, now U.S. Pat. No. 6,171,541, which claims benefit from Provisional Application Ser. No. 60/080,085, filed Mar. 31, 1998.

BACKGROUND OF THE INVENTION

The present invention relates to a method and apparatus for molding and cooling plastic molded articles such as preforms made of single or multiple materials such as plastic resins. In particular, the invention teaches a rapid injection molding process where the molded articles, such as PET preforms, are ejected from the mold before the cooling step is complete. This is possible as a result of the utilization of a new post-mold cooling process and apparatus where the preforms are cooled internally by convection heat transfer, after being removed from the mold and retained outside the mold area. The present invention also teaches additional external cooling, done through either convection or conduction heat transfer, which may take place at least partially simultaneously with the internal cooling.

Proper cooling of molded articles represents a very critical aspect of the injection molding process because it affects the quality of the article and impacts the overall injection cycle time. This becomes even more critical in applications where semicrystalline resins are used, such as the injection molding of PET preforms. After injection, the PET resin remains in the mold cavity space for cooling for a sufficient period of time to prevent formation of crystalline portions and to allow the preform to solidify before being ejected.

Two things typically happen if a preform is rapidly ejected from a mold in order to reduce the cycle time of the injection process. The first is that the preform is not uniformly cooled. In most instances, the bottom portion opposed to the mold gate is crystallized. The amount of heat accumulated in the walls of the preforms during the injection process will still be high enough to induce post molding crystallinity especially in the gate area of the preform. The gate area is a very critical spot because cooling of the mold in this portion is not effective enough and also because the resin in the mold cavity space is still in contact with the hot stem of the hot runner injection nozzle. If this area of a preform remains crystalline above a certain size and depth, this will weaken the quality of a blown article. The second is that the preform will be too soft and thus can be deformed during the next handling steps. Another critical area of a preform is the neck finish portion which in many instances has a thicker wall and thus retains more heat than the other portions. This neck portion needs aggressive post-mold cooling to prevent it from becoming crystallized. Also aggressive cooling tends to make the neck solid enough to sustain further manipulations.

Many attempts have been made in the past to improve the cooling efficiency of PET injection molding systems, but they have not resulted in a significant improvement in the quality of the molded preforms or a substantial reduction of the cycle time. Reference is made in this regard to the U.S. Pat. No. 4,382,905 to Valyi which discloses an injection molding method where the molded preform is transferred to a first tempering mold for a first cooling step and then to a second tempering mold for a final cooling step. Both tempering molds are similar to the injection mold and have internal means for cooling their walls that make contact with the preform during the cooling process. Valyi '905 does not teach the provision of cooling devices located on the means for transferring the preforms from the molding area or additional cooling devices that circulate a fluid coolant inside the molded parison.

U.S. Pat. No. 4,592,719 to Bellehache discloses an injection molding method for fabricating PET preforms where molded preforms are removed from the injection cores by a first movable device comprising vacuum sucking devices for holding the preforms and also comprising air absorption (convection) cooling of the outer surface of the preform. A second cooling device is used by Bellehache '719 in conjunction with a second movable device to further cool the inside of the preforms also by air absorption. See FIG. 22 herein. Bellehache '719 does not teach cold air blowing inside a preform which has a significantly higher cooling effect with respect to sucking or absorbing ambient air and also does not teach cooling means by conduction heat transfer located in intimate contact with the preforms wall and air blow means directed to the dome portion of the preforms. Bellehache suffers from a number of deficiencies including less cooling efficiency, less uniformity, longer cooling time, high potential for preform deformation.

U.S. Pat. No. 5,176,871 and 5,232,715 show a preform cooling method and apparatus. The molded preform is retained by the injection molding core outside the mold area. The mold core is cooled by a coolant that does not make contact with the molded preform. A cooling tube larger than the preform is placed around the preform to blow cooling air around the preform. The principal problem with the apparatus and method shown in these patents is that the preform is retained in the mold core and this significantly increases the cycle time. Also internal cooling is not achieved by direct contact between coolant and the preform.

Further reference is made to U.S. Pat. Nos. 5,114,327, 5,232,641, 5,338,172, and 5,514,309 that teach a preform internal cooling method using a liquid coolant. Preforms ejected from a mold are transferred to a preform carrier having vacuum means to retain the preforms in place without making contact with the preforms external wall. The preforms carrier however does not have any cooling devices. Cooling cores are further introduced inside the preforms retained by the carrier and a cooling fluid is blown inside the preforms to cool them. The coolant is further removed by the same vacuum means that retain the preforms from the chamber surrounding the preforms. These patents do not teach blowing cold air inside a preform where the air freely leaves the preform after cooling. These patents also do not teach simultaneous cooling of the preforms internally and externally or a preform carrier having cooling means. See FIG. 21 shown herein.

Further reference is made to Japanese Pat. Discl. 7-171888 which teaches a preform cooling apparatus and method. A molded preforms robot carrier is used to transfer the preforms to a cooling station. The robot includes external cooling of the preforms walls by conduction thermal transfer using a water coolant. The cooling station comprises a first movable transfer robot that has a rotary hand portion including vacuum means for holding the preforms and also external cooling of the preforms walls by conduction thermal transfer. The molded preforms are transferred from the robot carrier to the hand portion. The hand portion is moved from position A to position B where it is rotated by 90° in order to transfer the preforms (cooled so far only at the exterior) to a cooling tool. The cooling tool has means to hold the performs, devices to cool the inside of the preforms by blowing air and devices to cool the outside of the preforms by either blowing air or water cooling. The internal cooling which is employed is shown in FIGS. 19 and 20 herein. This patent does not teach a cooling method where internal and external cooling are performed as soon as possible from the moment the preforms are ejected from the mold and into a carrier plate. It also does not teach simultaneous internal and external cooling of the preforms while they are retained by the movable robot carrier. Therefore, this cooling method is not fast enough and does not prevent crystallinity formation outside the mold.

FIGS. 19 and 20 show known methods of internally cooling preforms where a cooling device is located outside the preform and is used to blow cool air inside the preform. Because the air nozzle is located outside the preform, the incoming cold air flow will inevitably interfere and mix at least partially with the outcoming warm flow. This will significantly reduce the cooling efficiency. If the cooling device is on the same axis with the preform, the approach of FIG. 19 is ineffective because there is no air circulation in the preform. If the cooling device is laterally shifted as in FIG. 20, internal air circulation is achieved, but this is still ineffective because one side of the preform is better and faster cooled than the other. The coolant has a quasi-divergent flow profile with a non-symmetrical profile. This profile is very ineffective and it does not allow to concentrate the cooling fluid/gas towards the sprue gate or dome portion.

SUMMARY OF THE INVENTION

It is a principal object of the present invention to provide a method and apparatus for producing preforms which have improved cooling efficiency.

It is a further object of the present invention to provide a method and apparatus as above which produce preforms having improved quality.

It is yet another object of the present invention to provide a method and apparatus as above which reduce overall cycle time.

The foregoing objects are obtained by the apparatus and method of the present invention.

In one embodiment, the innovative molding and cooling method of the present invention includes removing the preforms from the mold before the preforms are fully cooled inside the mold, i.e. the preforms retain a certain amount of heat that may potentially crystallize the sprue gate portion, the neck finish portion or the entire preform; retaining the preforms outside the molding area; and internally cooling the preforms by convection heat transfer so that crystallization does not occur in any of those regions.

In another embodiment, the innovative molding and cooling method of the present invention comprises removing the preforms from the mold before the preforms are fully cooled inside the mold, i.e. they still retain a certain amount of heat that may potentially crystallize the sprue gate portion, the neck finish portion or the entire preform; retaining the preforms outside the molding area; internally cooling the preforms by convection heat transfer so that crystallization does not occur in any of the aforementioned regions, said cooling step comprising placing the coolant in direct contact with the preform; and externally cooling the preforms by convection heat transfer so that crystallization does not occur in any of the aforementioned regions. The external cooling step may be performed simultaneously, at least partially simultaneously, or sequentially, with respect to the internal cooling step.

In yet another embodiment, the innovative molding and cooling method of the present invention comprises removing the preforms from the mold before the preforms are fully cooled inside the mold, i.e. they still retain a certain amount of heat that may potentially crystallize the sprue gate portion, the neck finish portion, or the entire preform; retaining the preforms outside the molding area; internally cooling the preforms by convection heat transfer so that crystallization does not occur in any of those regions, said internal cooling step comprising placing the coolant in direct contact with the preform; and externally cooling the preform by conduction heat transfer so that crystallization does not occur in any of the aforementioned regions. The external cooling step may be performed simultaneously, at least partially simultaneously, or sequentially with respect to the internal cooling.

In each of these embodiments, the preforms are ejected from the mold and are retained external to the mold by means independent of the mold such as for example a movable takeoff plate. Such independent retention means may retain one batch of molded preforms or several batches of preforms simultaneously. When several batches are held by the independent means, the batches will have different temperatures because they were molded at different times. According to the present invention, the molded preforms will be cooled in different sequences internally and externally using the cooling method of the present invention. In each embodiment of the present invention, internal cooling is done using means, such as cooling pins, that enter at least partially inside the preform and circulate coolant therein. Cooling is preferentially done by a quasi-symmetrical flow of coolant delivered inside the preform that can be directed towards the portions of the preforms that need more cooling than the others, such as the sprue gate and the neck finish. In a preferred embodiment of the present invention, the coolant is directed toward the bottom or dome portion of the preform so as to create an annular flow of coolant.

In certain embodiments of the present invention, the innovative internal cooling of the preforms is supplemented by external cooling that can be done in several ways. For example, the external cooling can be done on a take out plate (single or multiple position) that has cooling means operative using either conductive (cooled water) or convection (air/gas) heat transfer. It also can be done on a take out plate (single or multiple position) that does not have cooling means whereby the preforms are only partially in contact with their holders. In this way, cooling gas/air can be delivered by an independent cooling device to directly touch the outer surface of the preforms.

Yet in another embodiment, the preforms are retained in a take-out plate that does not have any cooling means and are solely cooled internally by the new cooling pins of the present invention.

The innovative cooling approach of the present invention in one embodiment may be achieved by removing the preforms or molded articles from the mold, holding the preforms or molded articles in a robot take-off-plate having a system for cooling the exterior surfaces of the preforms or molded articles, and thereafter engaging cooling means inside the preform or molded article to effect simultaneous cooling of the exterior and interior surfaces. According to the present invention, an additional cooling step is introduced whereby the temperature of the preform is reduced using heat transfer by convection, such as by circulating a cooling gas inside the preform.

The method and apparatus according to the present invention, as previously discussed, can be advantageously used to prevent crystallization in the most critical areas of preforms, namely the bottom part or the dome portion where the sprue gate is located and the neck portion. Further, the cooling method and apparatus of the present invention can be integrated into an injection-blow molding machine where the cooled preforms with no crystallinity are further temperature conditioned and blown into bottles.

In accordance with one aspect of the present invention, a method for preventing crystallization in an injection molded preform by enhanced out of the mold cooling comprises injecting a molten material into a mold formed by two mold halves or plates which in a mold open position are spaced apart so as to define a molding area; cooling the molten material while in the mold cavity space formed by the mold halves up to a temperature substantially close to the crystal-glass transition temperature of the molten material so that the molded article can be mechanically handled outside the mold without suffering any geometrical deformation; opening the mold halves by a distance sufficient to allow a molded article carrier to be moved between the two mold halves; ejecting the molded articles from the mold and transferring them to the movable carrier; cooling the molded articles while they are in the movable carrier by heat transfer conduction to reduce crystallinity whereby the coolant is blown air; and further internally cooling the molded articles by convection heat transfer until each molded article is substantially free of any crystallized portion. The same method can be implemented using a movable carrier including convective heat transfer means for external cooling.

In accordance with one aspect of the present invention, the apparatus for forming a de-crystallized, injection molded article comprises a mold having two mold halves which can be moved between a mold closed position and a mold open position; means for injecting molten material into the mold while the mold halves are in the mold closed position; means for cooling the molten material in the cavity space formed by the mold halves up to a temperature substantially close the crystal-glass transition temperature of the molten material so that the molded article can be mechanically handled outside the mold without suffering any geometrical deformation; means for opening the mold so that the mold halves are spaced apart a distance sufficient to allow a molded article carrier to be moved in between the two mold haves; means for ejecting the molded articles from the mold; means for transferring the molded articles to the movable carrier; said carrier having means for holding the preforms and for cooling the molded articles by heat transfer conduction to reduce crystallinity; and means for further internally cooling the molded articles by convection heat transfer until each molded article, preferably the entire article, is substantially free of any crystallized portion, particularly in the mold gate area. The same method can be implemented using a movable carrier with conductive heat transfer means for external cooling.

As used herein, the terms "take-off plate", "take-out plate" and "end of arm tool" are used interchangeably and refer to the same structure(s).

Other details of the method and apparatus of the present invention, as well as other objects and advantages attendant thereto, are set forth in the following detailed description and the accompanying drawings in which like reference numerals depict like elements.

BRIEF DESCRIPTION OF THE DRAWINGS

FIG. 5 is a sectional view showing a movable robot including an end-of-arm-tool (EOAT) device placed in the molding area between the stationary and movable mold plates;

FIGS. 6(a) and 6(b) are side views showing an embodiment of the present invention including a robot takeoff-plate (or end of arm tool, EOAT) and a frame holding cooling pins;

FIGS. 6(c) and 6(d) are front views of the embodiment of FIGS. 6(a) and 6(b);

DETAILED DESCRIPTION OF THE INVENTION

Figure 1:
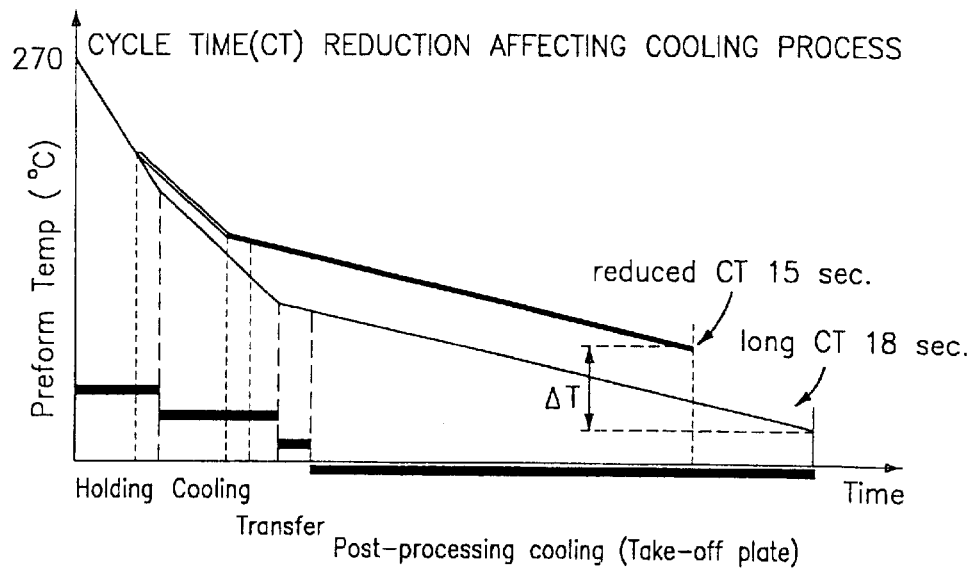
FIG. 1 is a graph showing the preform temperature vs. time during and after the injection step.
Figure 2:
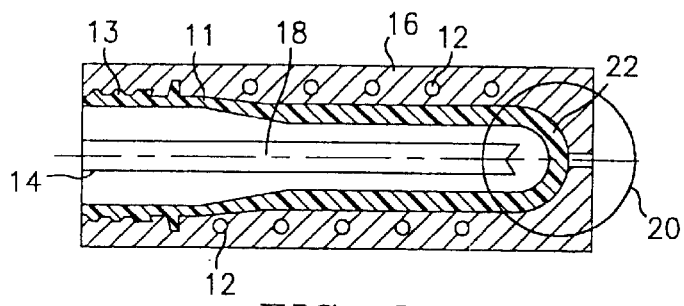
FIG. 2 is a schematic representation of a preform in the mold.

Referring now to the drawings, FIG. 1 is a graph showing the evolution of preform temperature vs. time during and after the injection step. FIG. 2 is a schematic representation of a preform while it is in the mold. As can be seen from this figure, cooling while in the mold is typically effected by cooling tubes 12 and 14 positioned within the mold cavity 16 and the mold core portions 18 respectively. As a result, cooling is effected from both sides of the preform 11. Further, as shown in FIG. 2, the mold cavity plate 16 typically has a gate region 20 at which the bottom part or the dome portion 22 of the preform 11 is formed. The preform has a neck finish portion 13 which sometimes has a thick wall which is difficult to cool to prevent crystallinity.

Figures 3A, 3B:
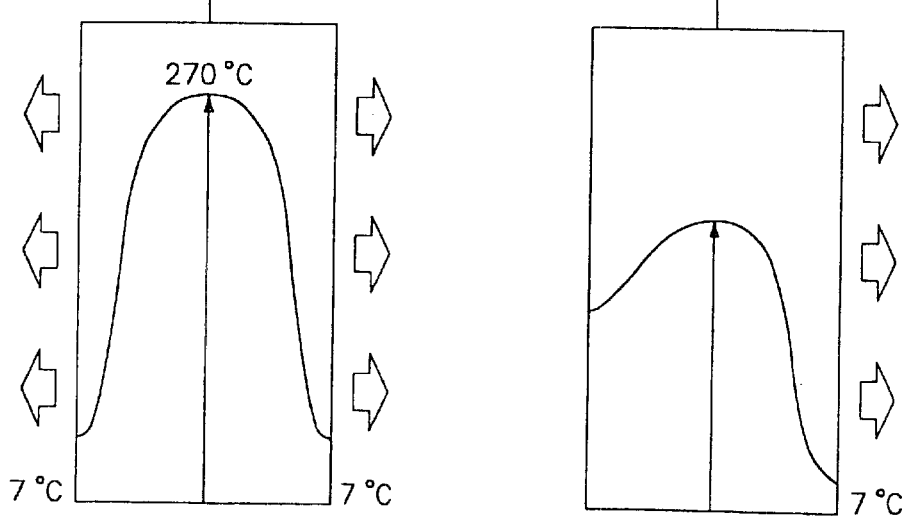
FIGS. 3(a) and 3(b) show the temperature gradient across the walls of a molded preform during cooling.
Figure 3C:
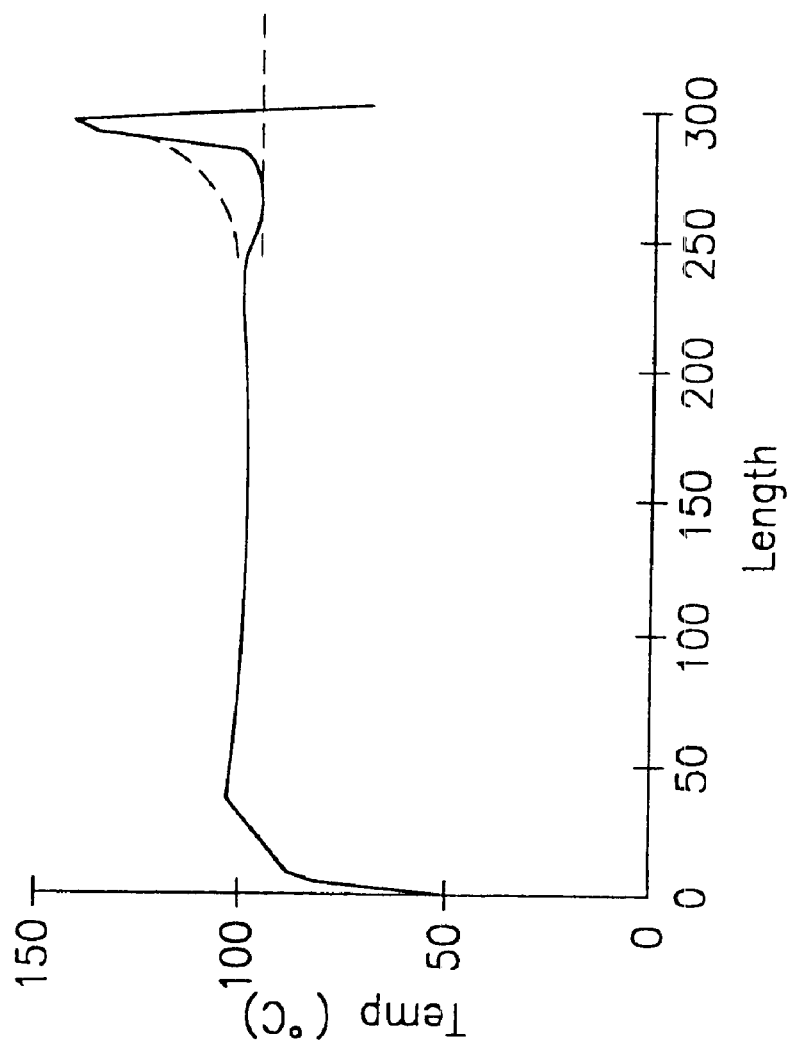
FIG. 3c shows the temperature profile along the preform walls.

FIGS. 3(a) and 3(b) show the temperature gradient across the walls of a molded preform during cooling. FIG. 3(a) shows the temperature gradient inside the mold, while FIG. 3(b) shows the temperature gradient outside the mold. FIG. 3(c) shows the temperature profile along the preform walls. The temperature spike represents the temperature in the dome or sprue gate portion of the preform.

Figure 4:
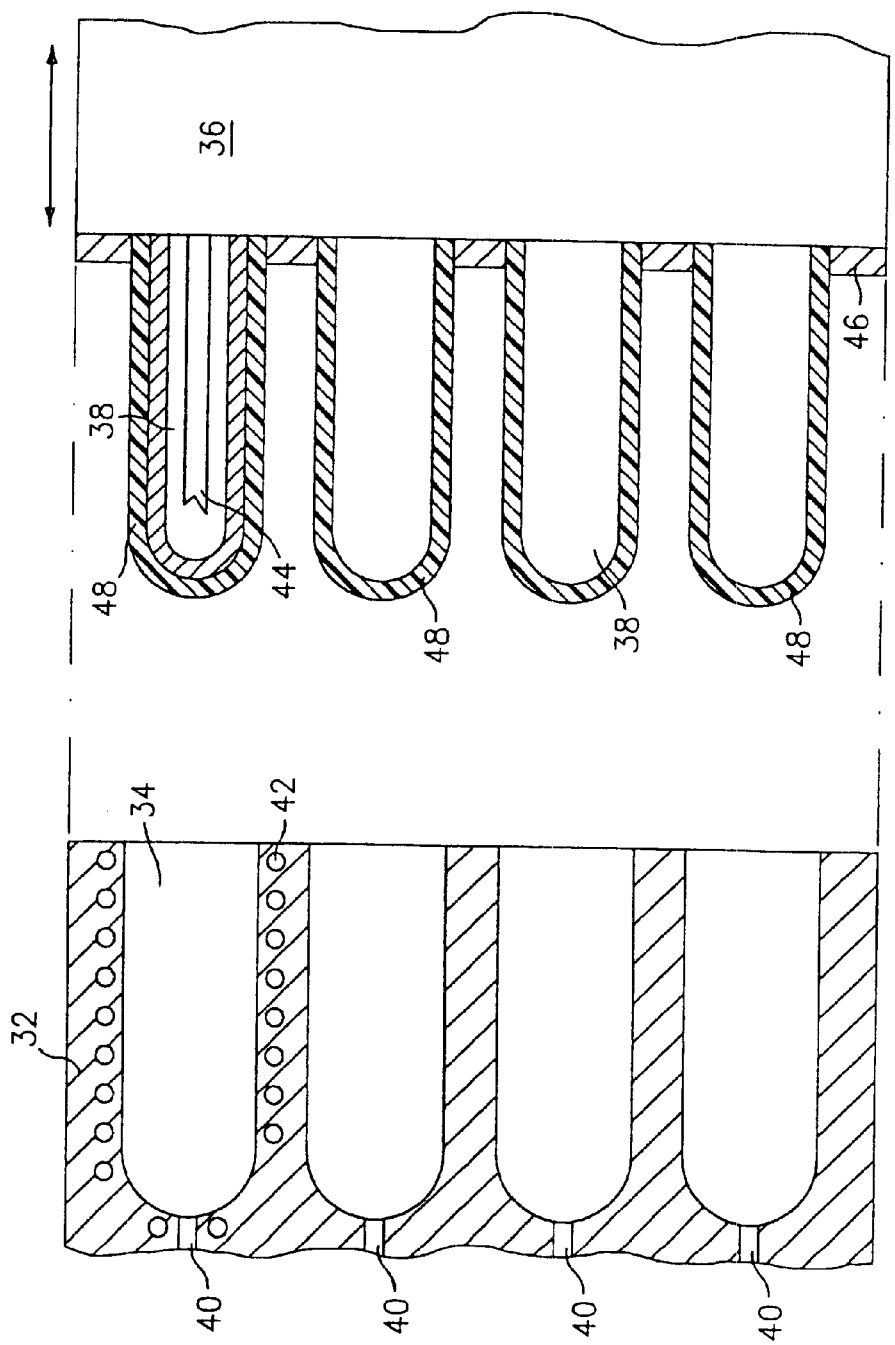
FIG. 4 is a sectional view showing a prior art injection mold.

Referring now to FIG. 4, an injection mold is provided which includes a stationary mold half or plate 32 having an array of mold cavities 34 and a movable mold half or plate 36 having an array of mold cores 38. The mold cavity plate 32 is in fluid communication with a manifold plate (not shown) that receives molten material from an injection unit (not shown) of an injection molding machine. The mold cavities 34 receive the molten material from hot runner nozzles (not shown), such as for example a valve gated nozzle (not shown), through mold cavity gates 40. The mold cavities are each surrounded by cooling means 42 for cooling the molten material in the cavity space formed by the mold core 38 and the mold cavity 34 when the mold plates 32 and 36 are in a mold closed position. The cooling means 42 are preferably formed by cooling channels embedded within the mold plate 32 for conducting a cooling fluid. As previously discussed, the mold cores 38 and the mold cavities 34 form in the mold closed position a plurality of mold cavity spaces (not shown) that are filled with molten material through the mold gates 40 during the injection step. The mold cores 38 also include means 44 for cooling the molten material in the cavity space. The cooling means 44 preferably comprise a cooling tube within each mold core. The mold core plate 36 further includes an ejector plate 46 which is used to remove the molded preforms 48 from the mold cores 38. The operation of the ejector plate 46 is well known in the prior art and does not form part of the present invention. In fact, the ejector plate 46 may comprise any suitable ejector plate known in the art.

According to the current invention, any molten plastic, metal or ceramic material can be injected into the mold cavity space and cooled into a desired article using the mold system of FIG. 4. In a preferred embodiment of the current invention, the molten material is PET and the molded article is a preform. According to the present invention however, the molded article can also be a preform made of more than one material, such as for example virgin PET, recycled PET and an appropriate barrier material such as for example EVOH.

As is known in the art, a preform is molded by closing the mold, injecting the molten material into the cavity space, initiating cooling of the cavity space, filling the cavity space, holding the molten material under pressure, performing final in-mold cooling, opening the mold, ejecting the solidified articles or preforms from the cores and transferring the articles or preforms to a take-off plate.

According to the present invention, in order to reduce the overall cycle time, the residence time of the preform in the mold has to be minimal so that the mold is able to produce batches of preforms as fast as possible. The problem with a reduced residence time in the mold is that the cooling time has to be reduced, but in such a manner that the molded articles or preforms are solid enough to withstand all the subsequent handling steps without deformation. A reduced cooling time is a problematic option because the articles or preforms are not sufficiently and uniformly cooled by the cooling means 42 and 44. The amount of heat retained by the article or preform after being cooled inside the mold for a reduced time and immediately after opening the mold is very significant and depends on the thickness of the molded article or preform. This internal heat has the potential to generate crystallized portions at the sprue gate area or dome portion of the molded article or preform, the neck finish portion of the molded article or preform, or the entire preform. In order to prevent the crystallization of the molded article or preform, a very aggressive cooling method has to be used. During cooling, attention must be paid so as to control the shrinkage of the molded articles which can adversely affect their final dimensions.

FIG. 5 illustrates one embodiment of a robot take-off plate 60 which can be used in the cooling method of the present invention. The take-off plate 60 includes a plurality of hollow holders or receptacles 62 which can be water cooled tubes. Typical take-off plates which may be used for the take-off plate 60 are shown in U.S. Pat. No. 5,447,426 to Gessner et al. and in U.S. Reissue Patent No. RE 33,237 to Delfer, III, both of which are incorporated by reference herein. In operation, the mouth of a plurality of holders 62 are aligned with the mold cores 38 of the mold plate 36. Transfer of the molded articles 48 to the holders 62 is effected by operation of the ejector plate 46. According to the present invention, the take-off plate 60 can be provided with a number of holders 62 equal to the number of mold cores 38 or a larger number of holders 62 such as a multiple of the number of mold cores, for example three or four times the number of mold cores. By having more holders 62 than the number of cores 38, it is possible to retain some of the molded articles for a time longer that a single molding cycle and thereby increase the cooling time while maintaining a high output of molded articles. The method of the present invention can be carried out irrespective of the relative number of molded articles retained by the holders 62. Nevertheless, in the preferred embodiment of the invention, the robot take-off plate 60 has a number of holders 62 which represent three times the number of cores 38. This means that the take-off plate 60 does not always carry a number of preforms or molded articles equal to the number of holders 62. This also means that a single batch of preforms can be moved back more than once into the mold area between the mold core and cavity plates to pick up other batches of molded articles, while being cooled by intimate contact between the hollow tubes 64 within the take-off plate, which tubes 64 carry a cooling liquid such as water, and the external wall of the preforms as shown in more detail in the aforementioned U.S. Pat. No. 5,447,426. The heat transfer between the tubes 64 and the hot molded articles released from the mold is performed through conduction. More particularly, any solid material incorporating any cooling means can be used and brought into intimate contact with the exterior wall of the molded articles to cool the molded articles. By using a cooling system based on heat transfer through conduction implemented through an intimate contact between the molded article or preform and the cooling means, the shape of the article or preform is maintained without deformations or scratches caused by handling.

If desired, the conductive cooling means 64 employed in the take-off plate can be replaced by a convective heat transfer means. Any suitable convective heat transfer means known in the art may be used with the take-off plate 60 to effect cooling of the exterior surfaces of the molded articles or preforms carried by the take-off plate 60.

Referring now to FIGS. 6(a) and 6(b), an additional cooling device 70 is used in conjunction with the robot take-off plate 60 to enhance the post-mold cooling efficiency by allowing simultaneous cooling of the interior and exterior surfaces of the molded articles or preforms by convective heat transfer and thus reduce the cycle time and improve the quality of the preforms. The additional cooling device 70 includes an array of elongated cooling pins 74 whose role is to deliver a cooling fluid inside the molded articles held by the take-off plate 60. In a preferred 20 embodiment of the present invention, the cooling fluid is mostly directed and delivered directly into the dome (sprue gate) portion 22 of the molded article or preform, which portion has the highest chance to become crystalline due to the reduction of the cooling time in the mold. The cooling fluid is introduced so as to create an annular flow pattern. According to the present invention, the cooling fluid could be any appropriate coolant, such as for example a liquid or a gas. In a preferred embodiment of the present invention, the cooling fluid is pressurized air delivered at through a channel 90 located inside the cooling pin 74. This aspect of the present invention is shown in more detail in FIG. 9(a).

Figure 9A:
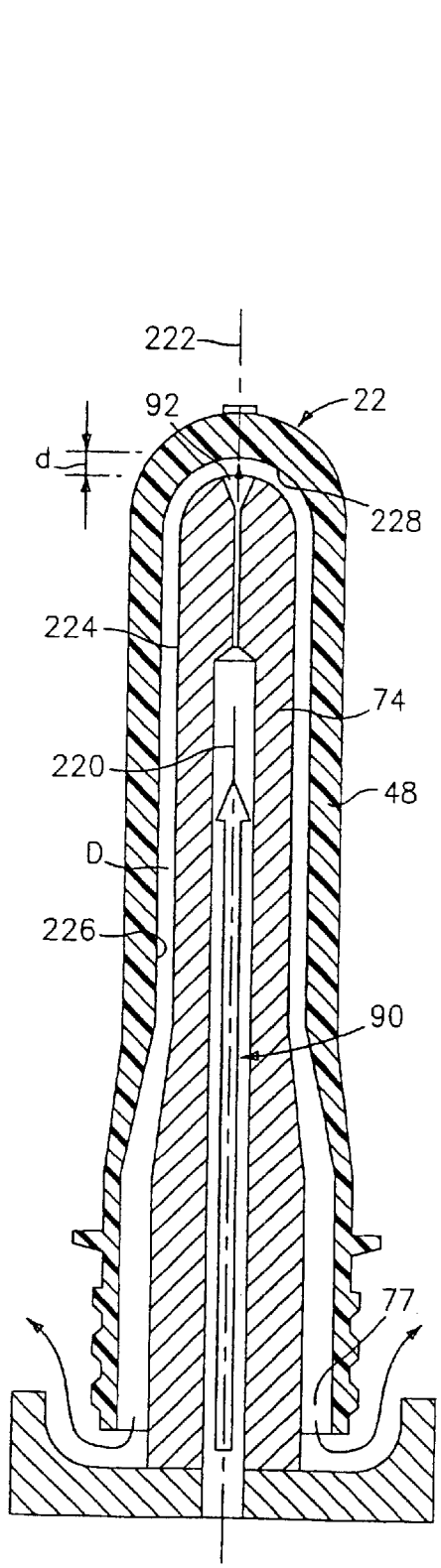
FIGS. 9(a) and 9(b) illustrate a more detailed view of the cooling pins according to two embodiments of the present invention.

FIG. 9(a) illustrates a cooling pin 74 in accordance with the present invention positioned within a preform or molded article 48 being cooled. In order to create an optimum flow of the cooling agent, the cooling pin 74 is introduced deep inside the preform 48 so that the coolant can reach the dome or sprue gate portion 22. More than that, the cooling pin 74 acts as an additional cooling core. The cooling pin 74 also contributes to the creation of an annular flow pattern which has a higher cooling potential than other cooling flow patterns. Also by using the novel cooling pin 74, the incoming blown cold air and outcoming warm air are completely separated and thus prevents mixing of the two.

As shown in FIG. 9(a), the cooling pin 74 is positioned centrally within the preform or molded article, preferably so that the central axis 220 of the cooling pin 74 is aligned with the central axis 222 of the preform. As can be seen from this figure, the outer wall 224 of the cooling pin 74 in an upper region UP is spaced from the inner wall 226 of the preform by a distance D. Additionally, the outlet nozzle 92 of the cooling pin 74 is spaced from the inner wall 228 of the dome portion 22 by a distance d. In order to create the desired annular flow pattern of cooling fluid, it is preferred that the ratio of d:D be within the range of about 1:1 to about 10:1. It is also highly desirable that the outlet nozzle 92 of the cooling pin be formed by a divergent nozzle construction. While it is preferred to use a divergent nozzle for the outlet 92, it is possible to form the outlet 92 from a straight walled nozzle construction.

Because cooling pin 74 goes deep inside the preform and behaves like a cooling core as well, the pattern of outcoming warm air that freely escapes from the preform has an annular shape.

Figures 8A, 8B, 8C, 8D:
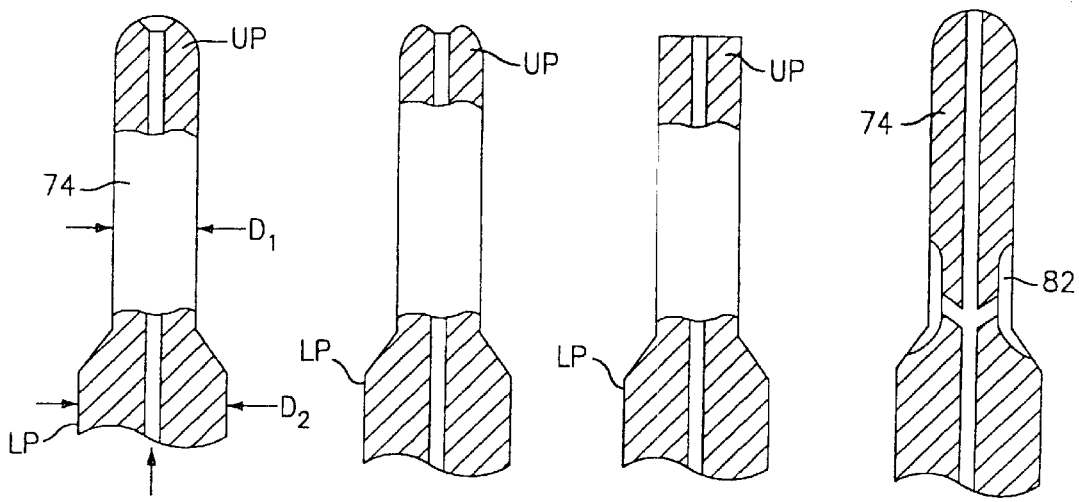
FIGS. 8(a)–(g) shows several cooling pin designs according to the present invention.
Figures 8E, 8F, 8G:
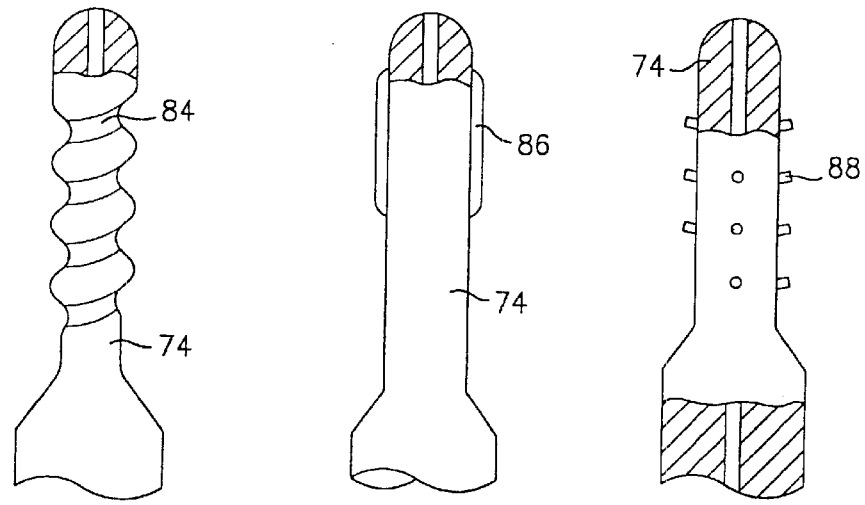
Figure 11A:
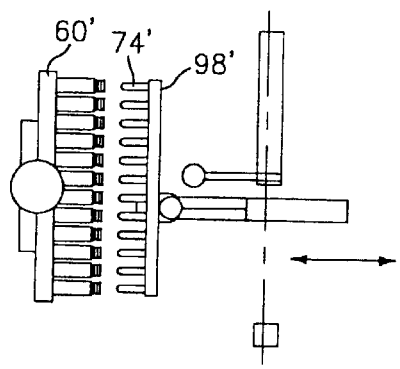
FIGS. 11(a)–11(l) show another embodiment of the frame and cooling pins according to the present invention.
Figure 11B:
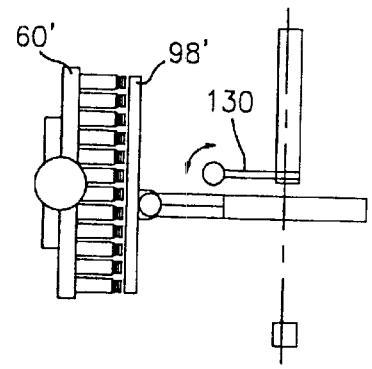

While a preferred construction for the cooling pin has been shown in FIG. 9(a), as shown in FIGS. 8(a) through 8(g), 17 and 18, the cooling pins 74 can have various sizes and shapes to achieve various cooling effects. For example, as shown in FIG. 8(a), the lower portion LP of the cooling pin may have a diameter $D_2$ which is different from the diameter $D_1$ of an upper portion UP of the pin. As shown in FIGS. 8(a) through 8(c), the upper portion UP of the pins may have different shapes. Referring to FIG. 8(d), the cooling pin 74 may have lateral outlets 82 for discharging a cooling fluid onto side walls of the molded article where crystallinity may occur. As shown in FIG. 8(e), the cooling pin 74 could have helical grooves 84 to obtain specialized cooling effects. Similarly in FIG. 8(f) and 8(g), the cooling pin 74 could have a plurality of ribs 86 spaced about its periphery or a plurality of contact elements 88.

Figure 18B:
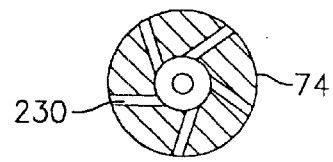
FIGS. 18(a) and (b) illustrate the construction of yet another alternative cooling pin in accordance with the present invention.
Figure 18A:
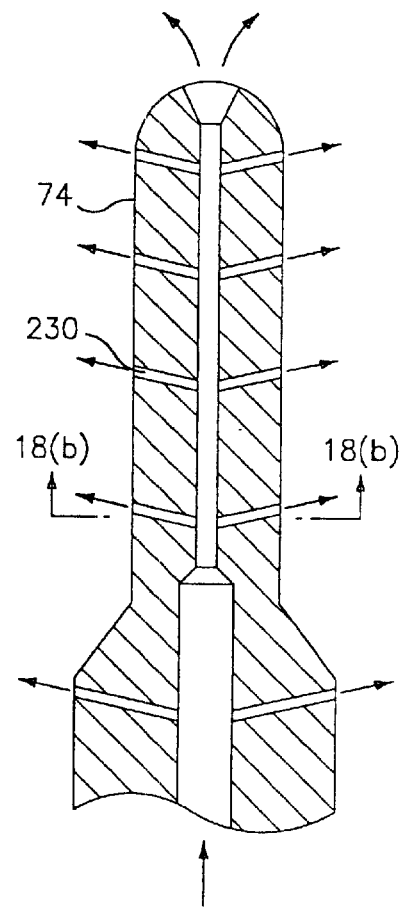
Figure 19:
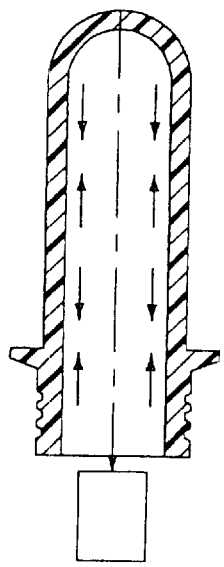
FIGS. 19 and 20 illustrate prior art methods for cooling the interior of a preform.
Figure 20:
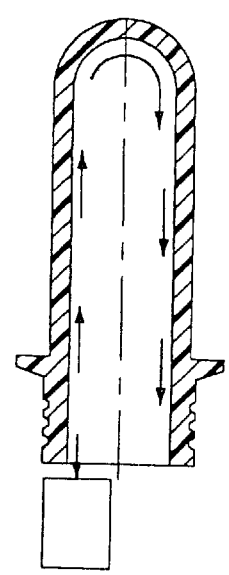
Figure 21:
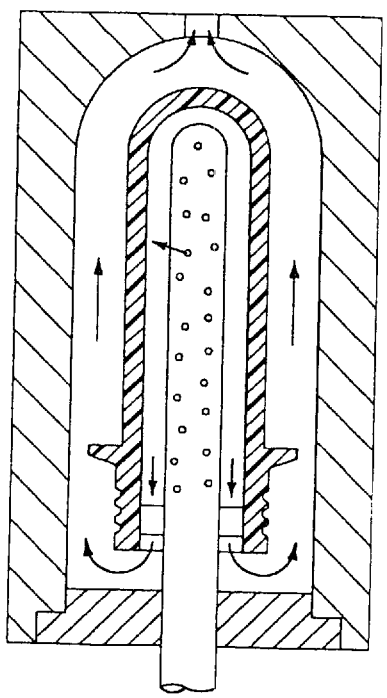
FIG. 21 illustrates another prior art system for cooling the interior and the exterior of a preform.
Figure 22:
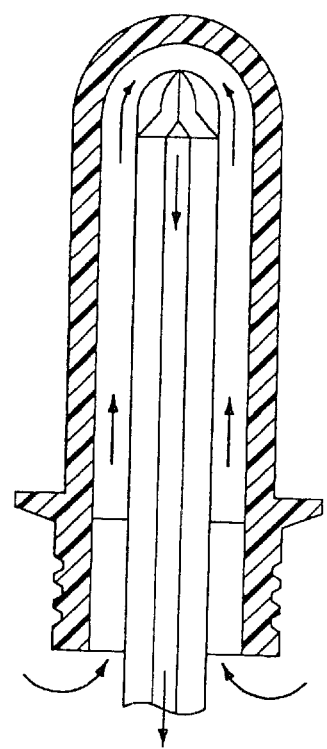
FIG. 22 illustrates a prior art system using the sucking of ambient air to cool a preform.

FIGS. 18a and 18b illustrate a cooling pin 74 having a plurality of radial conduits 230 for delivering coolant on areas of the preform other than the dome portion 22 such as the neck finish portion or the body portion. The radial conduits 230 may be spaced along the length of the cooling pin so as to direct coolant against particular areas of a preform 48.

Figure 17:
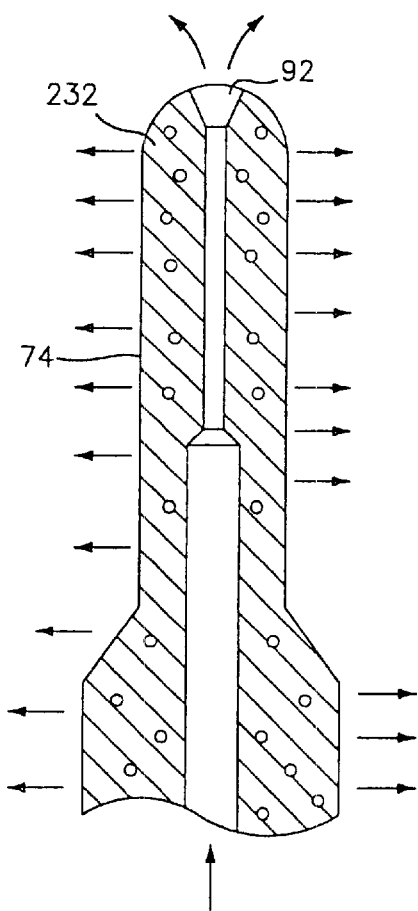
FIG. 17 illustrates the construction of an alternative cooling pin in accordance with the present invention.

The cooling pins 74 can be made from any suitably thermally conductive or thermally insulative material. If desired, as shown in FIG. 17, the cooling pin 74 may be made from a porous material 232 so that additional coolant can be spread in a very uniform manner on areas of a preform other than the dome or sprue gate portion 22.

In a preferred embodiment of the present invention, the design of the cooling pin 74 is intended to concentrate maximum cooling at the sprue gate or dome portion 22 of the molded article 48 and thus aggressively focus the cooling fluid to cool this region. In this way, molded articles such as preforms free of crystallized areas in the sprue gate or dome portion 22 can be formed.

Figure 9B:
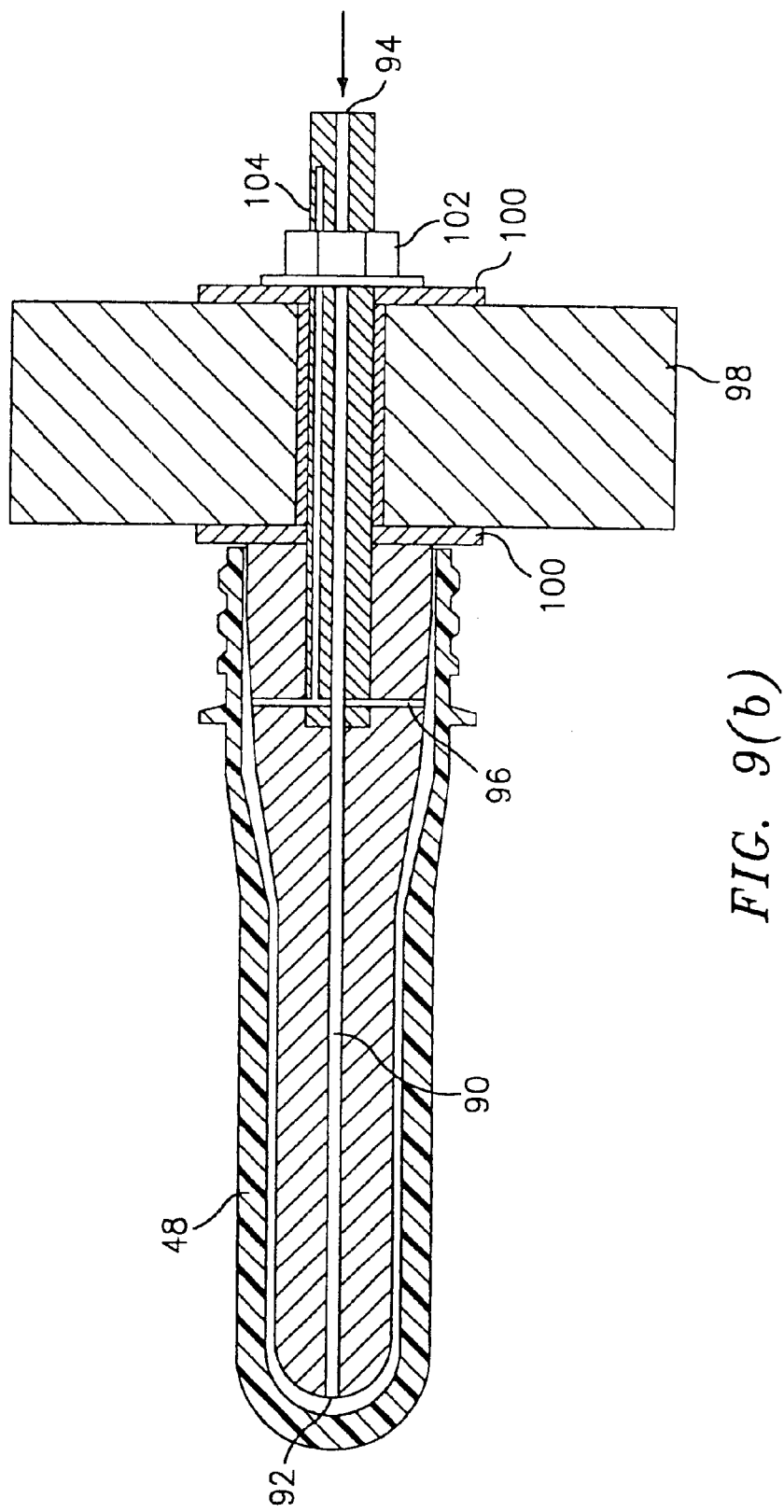

An alternative pin construction with a cold air blowing system which can be used in the apparatus of the present invention is illustrated in FIG. 9(b). As shown therein, the pin 74 has a cold air blowing channel 90 having an outlet 92 for directing cold air against the interior surfaces of the molded article 48, preferably the dome or sprue gate portion 22 of the molded article. The channel 90 communicates with a source of cold air (not shown) via the inlet 94. The cooling pin 74 is further provided with a vacuum channel 96 for removing the cooling air from the interior of the molded article 48. The vacuum channel 96 may be connected to any desired vacuum source (not shown). As can be seen in FIG. 9(b), the cooling pin 74 is mounted on a portion of a frame 98 by sliding pads 100, which are used for pin self-alignment, and a fastening means such as nut 102. The nut 102 can be secured to the element 104 which has an exterior threaded portion (not shown).

Referring now to FIGS. 6 and 7, the array of cooling pins 74 is mounted onto a cooling frame 98 which can be made of a lightweight material such as aluminum. According to the present invention, the cooling frame 98 can be operated in either a vertical or a horizontal position. In both cases, the frame 98 is movable towards the take-off plate 60 when the take-off plate 60 reaches its final out of mold position. Any suitable means known in the art may be used to move the frame 98 so as to advance it at a high speed so that the cooling pins 74 can be immediately introduced inside the molded article. In a preferred embodiment of the present invention, the frame 98 is moved using hydraulic cylinders 110. According to the present invention, the number of cooling pins 74 can be the same or less than the number of receptacles 62 in the take-off plate 60. According to the present invention, the take-off plate 60 is provided with means for holding the molded articles or preforms 48 within the receptacles 62 such as suction means (not shown), and with means for ejecting the preforms from the take-off plate.

The holding means and the ejection means may be those disclosed in the aforementioned U.S. Pat. No. 5,447,426 which has been incorporated by reference herein. As shown in FIGS. 6(c) and 6(d), the cooling frame 98 is provided with a plurality of spaces 112. The spaces 112 allow finally cooled molded articles or preforms ejected from the take-off plate 60 to be dropped onto a conveyor 114 for transportation away from the system. In a preferred embodiment of the present invention, the fully cooled preforms 48 are dropped onto the conveyor 114 through the spaces 112 by laterally shifting the cooling pins 74 relative to the receptacles 62 holding the preforms that have to be ejected from the take-off-plate 60. This is the case when the cooling frame is in a horizontal position. When the cooling frame is in a vertical position, it does not interfere with the preforms dropped by the take-off plate.

Figure 7A:
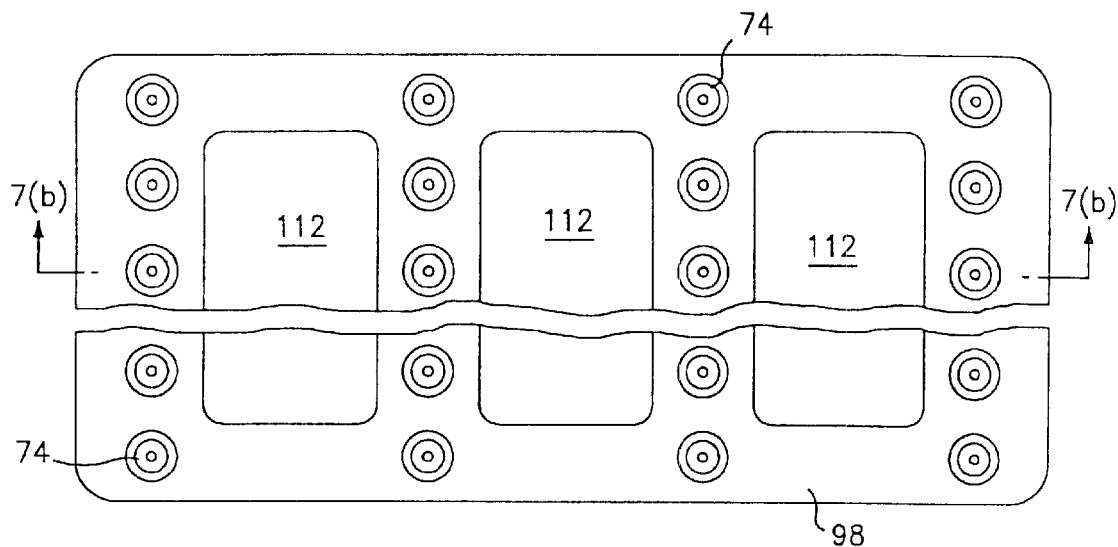
FIGS. 7(a)–7(d) shows the frame and the cooling pins according to a first embodiment of the present invention.
Figure 7B:
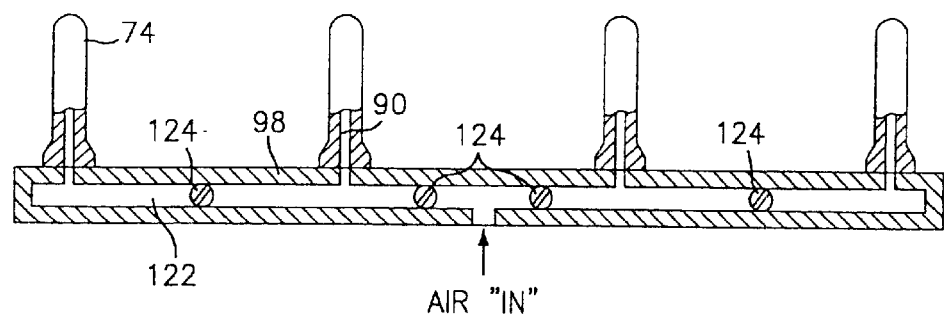

Referring now to FIGS. 7(a) and 7(b), a first array of cooling pins 74 is illustrated. As can be seen in FIG. 7(b), the cooling pins 74 each have cooling air passageways 90 which communicate with a source of cooling air (not shown) via the passageway 122. Incorporated into the passageway 122 are a number of air valves 124 which can be used to regulate the flow of cooling air. In this way, variable amounts of cooling air can be supplied to the cooling pins 74.

Figure 7C:
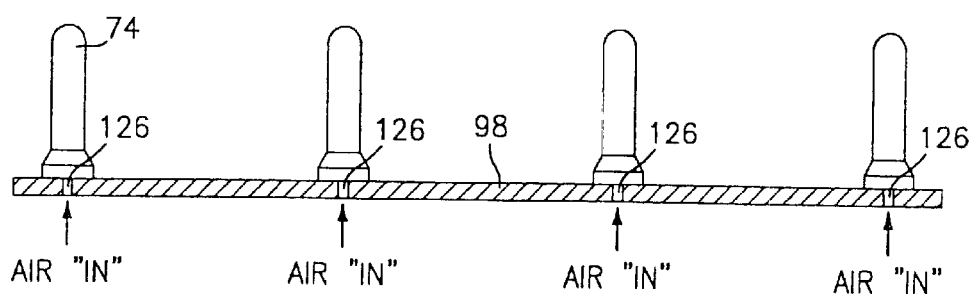
Figure 7D:
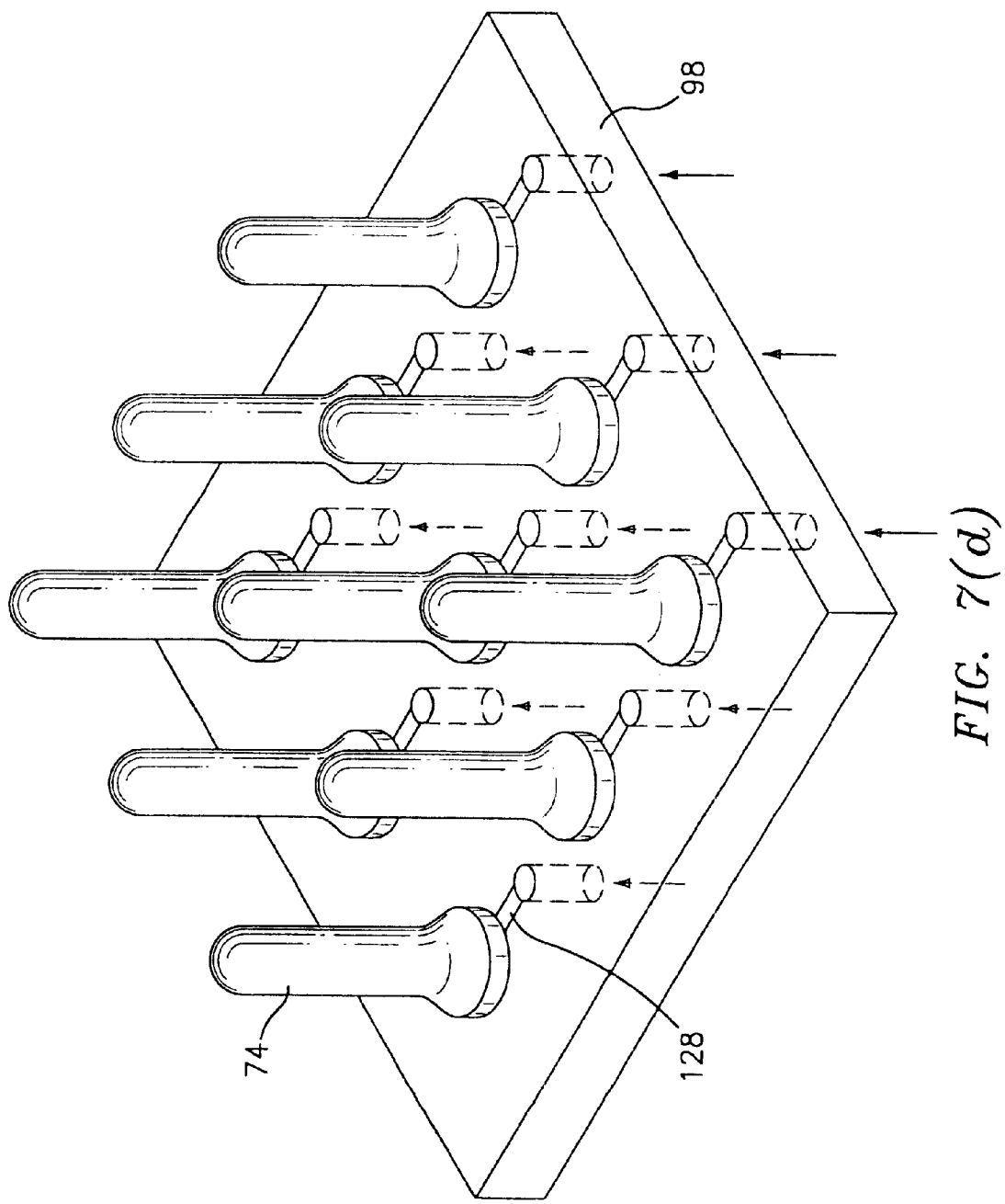

Referring now to FIG. 7(c), it is also possible to directly provide each cooling pin 74 with air from a source of cooling fluid (not shown) via a simple passageway 126. Still further, as shown in FIG. 7(d), if desired, the passageway 126 could be connected to the fluid conduit 120 in each of the cooling pins via a flexible conduit 128.

According to one embodiment of the present invention, the cooling pins 74 enter the preforms retained by the takeoff plate 60 in a few steps, and at each step the preforms that are molded at different times are at different temperatures. In order to optimize the overall cooling step and to avoid the waste of coolant, during the first step of cooling the preforms are very hot and thus a maximum amount of cooling air is delivered by the pins. In the second and the subsequent steps, the amount of cooling air directed by the pins engaging the first molded preforms is substantially less than the amount directed towards the newly molded and hotter preforms. In order to further optimize the cooling process, any known suitable temperature sensors, such as a thermocouples, can be used to measure the temperature of the preforms before and after cooling them so that adjustments of the cooling rate can be done without interrupting the molding cycle. In a preferred embodiment, thermocouples (not shown) connected to some cooling control means (not shown) are located in the take-off plate 60 adjacent to each preform. By monitoring the temperature of each preform, some adjustments can be made to the amount of cooling air delivered to all cooling pins 74 or to some of the cooling pins 74. This may also compensate for any cooling inefficiencies or non-uniformity of the conduction cooling means located in the take-off plate.

Figure 10A:
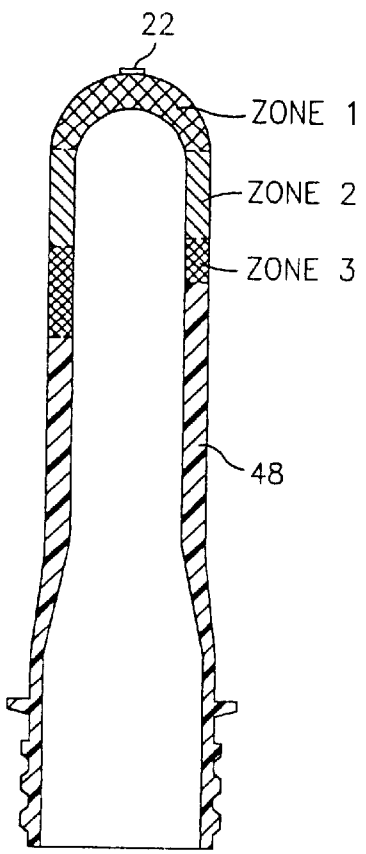
FIG. 10(a) shows a preform having crystallized zones as they are generated in prior art methods.
Figure 10B:
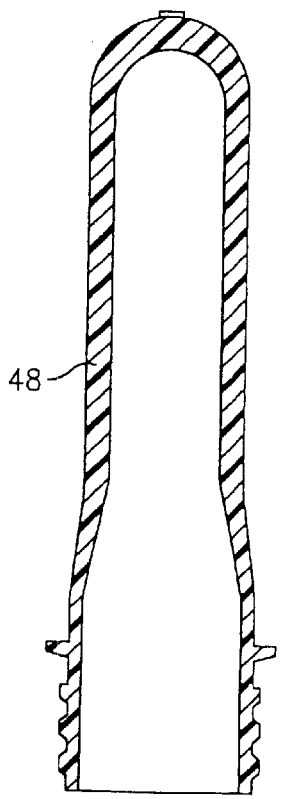
FIG. 10(b) shows a preform without crystallized zones as it results after the method of the present invention.

Referring now to FIGS. 10(a) and 10(b), FIG. 10(a) shows a preform 48, in sectional view, molded by a prior art system. As shown therein, the preform 48 may have crystalline areas in four different zones including the dome portion 22 and the neck portion 13. FIG. 10(b) on the other hand shows a preform 48, in section view, which has been manufactured using the system of the present invention. As shown therein, there are no areas of crystallinity.

Figure 11C:
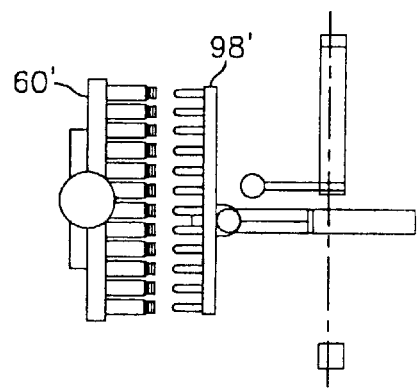
Figure 11D:
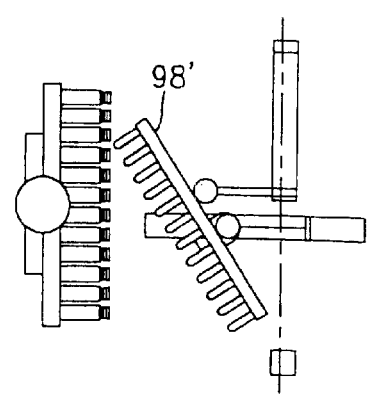
Figure 11E:
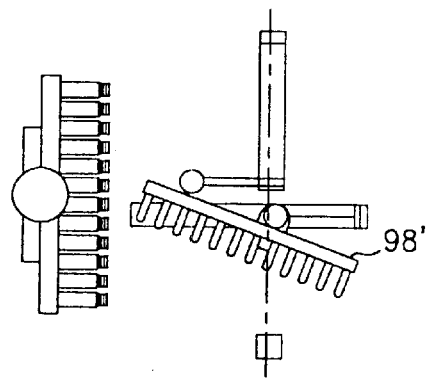
Figure 11F:
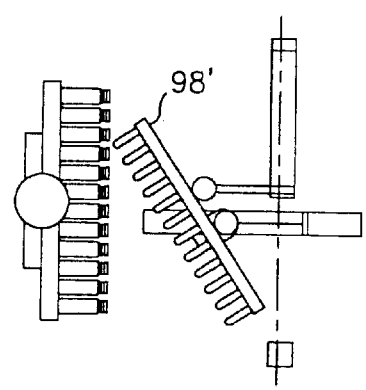
Figure 11G:
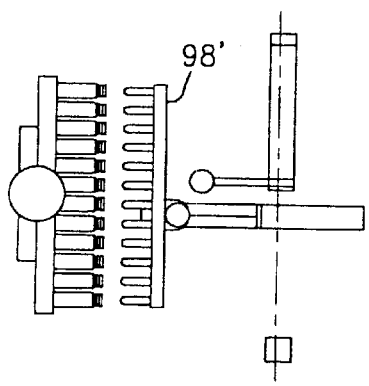
Figure 11H:
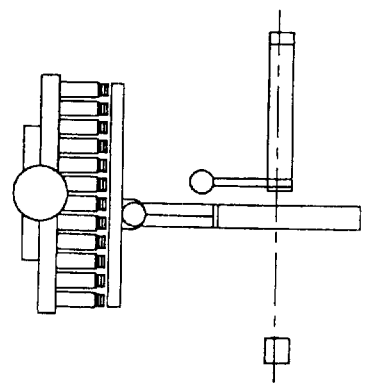
Figure 11I:
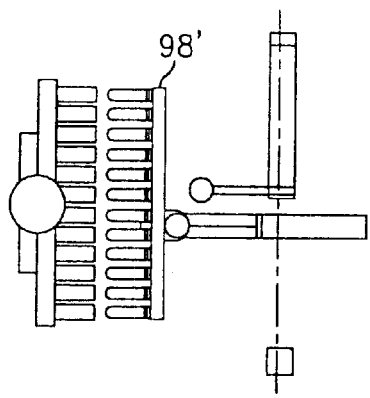
Figure 11J:
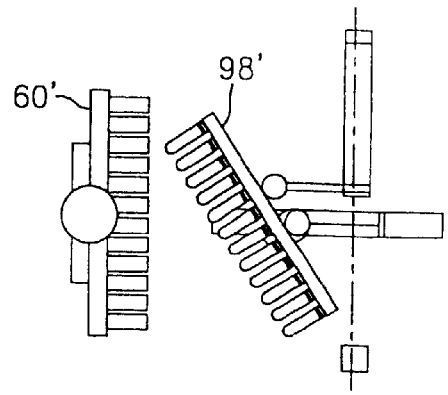
Figure 11K:
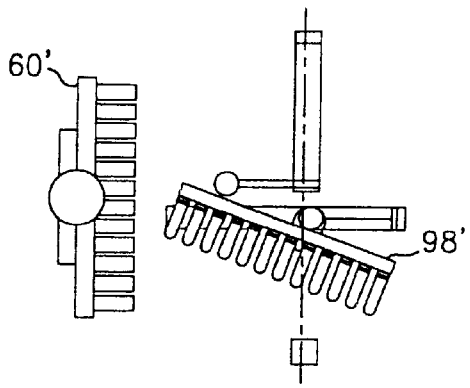
Figure 11L:
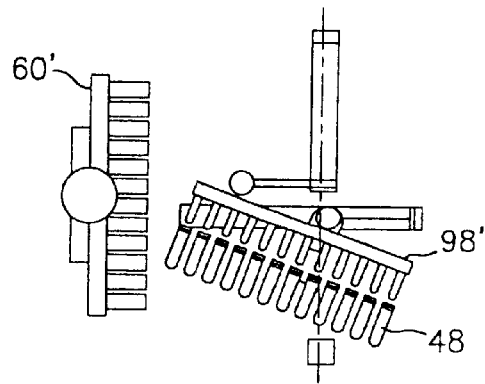

Another embodiment of the present invention is shown in FIGS. 11(a) through 11(l) where the take-off plate 60' is always maintained in a vertical position during the entire molding cycle. This eliminates a complicated motor and makes it lighter and thus faster to move in and out of the mold space formed between the mold halves or mold plates 32 and 36. The cooling frame 98' used in this system has an additional function and an additional movement. First of all, the pins 74' use blowing air to cool the molded articles or preforms and sucking air to extract the molded articles or preforms from the take-off plate 60'. The preforms are be held on the pins 74' by the vacuum and removed from the tubes 62' within the take-off plate 60' during a back movement. The cooling frame 98' has a movement to approach and move back from the take-off-plate 60' and further has a rotation to move from a vertical to a horizontal position parallel to a conveyor 114' to allow the preforms to be ejected from the pins 74' by stopping the vacuum. According to the present invention, any suitable means known in the art can be used to rotate the cooling frame 98' with the pins 74'. According to a preferred embodiment of the invention shown in FIGS. 11(a) through 11(l), a stationary cam 130 is used as a very simple means to convert the translation of the frame into a rotation so that the preforms held by the cooling frame can be dropped onto a conveyor 114'. As shown in FIG. 11(h), the cooling pins 74' can engage the preforms by vacuum and remove them from the take-off plate 60'. Next the preforms are dropped from the pins 74' onto a conveyor.

The operation of the innovative cooling apparatus of the present invention can be understood from FIGS. 6(a) through 6(d). After the in-mold cooling process which is shortened up to the point where the articles or preforms reach a solidification status that prevents their deformation, the mold is opened and the take-off plate 60 is moved into the molding area between the mold core plate 36 and the mold cavity plate 32. Relative movement between the mold core and mold cavity plates may be performed in any manner known in the art using any suitable means (not shown) known in the art. After the take-off plate 60 reaches the out of the mold position, the cooling pins 74 are engaged with the molded articles for cooling, especially in the dome area 22 of each article or preform.

While the take-off plate 60 has been described as having water cooled means for conduction cooling of the exterior surfaces of the preforms within the holders 62, there are times when one would want to not start cooling of the exterior surfaces when the preforms are first placed within the take-off plate. To this end, means may be provided to control cooling within the take-off plate so that such cooling does not start until after internal cooling of the preforms has begun and/or finished. For example, suitable valve means (not shown) may be incorporated into the take-off plate to prevent flow of a cooling fluid until a desired point in time. In this way, internal and external cooling of the preform may be preformed simultaneously, at least partially simultaneously, or sequentially.

Figure 16:
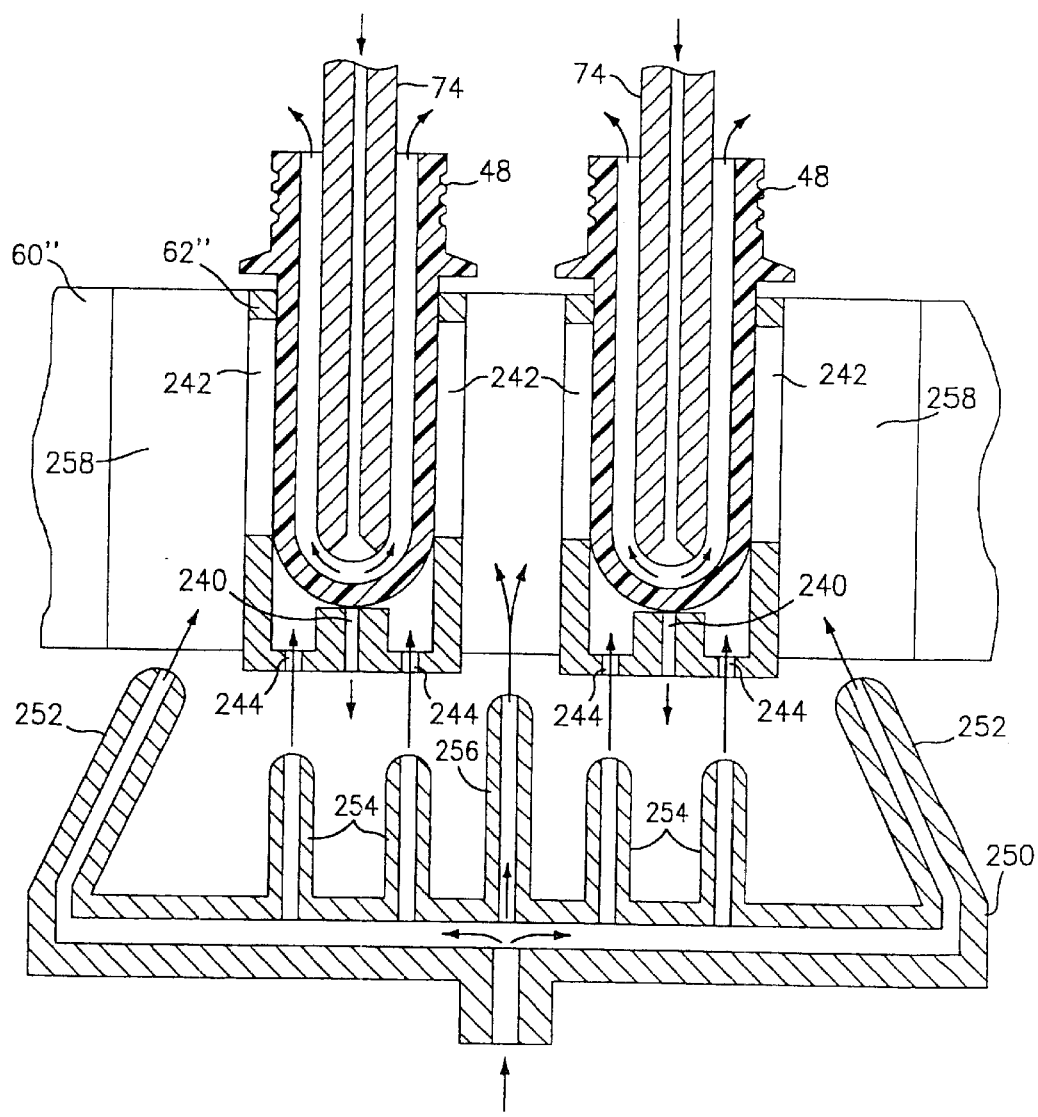
FIG. 16 illustrates an embodiment of the present invention wherein a take-off plate with no cooling means is used to remove the molded preforms from the molding area.

FIG. 16 illustrates another embodiment wherein a takeoff plate 60" with no cooling means is used to remove the molded preforms from the molding area. The take-off plate 60" may have preform holders 62" sufficient in number to accommodate either a single batch or multiple batches of preforms. The preforms are retained by vacuum means (not shown) that through the openings 240 suck on the sprue gate or dome portion 22 of the preforms 48. The preforms are also retained by the holders 62" which can have any desired configuration that allows the preforms to be directly cooled using a cooling gas/air. The holders 62" are preferably stiff enough to retain the preforms and have perforations or other openings 242 and 244 where the holders do not have any direct contact with the preforms. By having these kind of holders that only partially cover the outer surface of the preforms, the preforms can be cooled on their outer surfaces, while they are additionally cooled internally by the cooling pins 74. In this case, the cooling step comprises the transfer of the preforms from the mold to the take-off plate 60", the movement of the take-off plate 60" outside the molding area, to the cooling area which is adjacent the molding area. At the cooling area, the preforms 48 are internally cooled using the frame 98 and the cooling pins 74 that enter at least partially inside the preforms. At the same time, the preforms 48 retained by the take-off plate 60" have their exterior surfaces convectively cooled by an additional cooling station 250 that blows a coolant fluid towards the preform holders. As shown in FIG. 16, the additional cooling station 250 has a plurality of nozzles 252, 254, and 256 for blowing coolant toward the outer surfaces of the preforms. The nozzles 252, 254, and 256 blow cooling fluid through windows 258 in the take-off plate 60" and onto the outer surface of the preforms via windows or openings 242 and 244 in the preform holders. The nozzles 252, 254 and 256 blow cooling fluid through openings 242 and 244 in the preform holders 62" and onto the outer surface of the preforms. While the additional cooling station 250 has been shown as having nozzles for cooling two preforms, it should be recognized that in actuality the cooling station 250 may have as many nozzles as needed to cool the outer surfaces of any desired number of preforms.

The use of the additional cooling station 250 allows the preforms 48 to be simultaneously cooled inside and out using cooling means that are independent from the take-off plate 60". This approach makes the take-off plate 60" very light, very fast and easy to service. If desired, the preform holders 62" may grip the preforms solely around the neck portion, thus leaving a more open window for the blown cooling fluid to cool the outer portion of the preforms.

According to another embodiment of the invention, the take-off plate may include external cooling means using blown air or may include no cooling means. In both cases, internal cooling is achieved using the novel cooling method and apparatus of the present invention.

The innovative cooling method and apparatus of the present invention are extremely beneficial for cooling preforms molded in high cavitation molds. It is well known that the temperature of the molten resin flowing through a mold varies quite substantially for a various of reasons including: (a) non-uniform heating of the hot runner manifold; (b) formation of boundary layers inside the manifold's melt channels; (c) non-uniform mold cavity cooling; and (d) insufficient cooling at the mold gate area. One consequence of the temperature variations across the mold is that the cooling time has to be adjusted at the local level so that the hottest preforms are cooled before any crystallinity occurs in the final preforms. In order to prevent formation of crystallized zones, the cooling system of the present invention is able to provide a different cooling pattern that can be tuned according to the temperature signature of each mold. Sensors in the take off plate 60 can be provided to regulate the amount of cooling from each cooling pin 74. Another consequence of the non-uniform temperature inside the mold is that in most cases the gate sprue area located on the dome section 22 of the preforms is the hottest part of the molded preform. Because this sprue gate portion is slower cooled in the mold closed position, chances are that this portion will be highly crystalline if the in-mold cooling is too long or if no additional cooling is provided outside the mold. According to the present invention, the cooling pins 74 blowing cold air inside the preform immediately adjacent the sprue gate area is a novel operation that prevents in a very efficient manner the formation of crystallized areas in the preform.

The innovative cooling method and apparatus of the present invention are also beneficial for compensating for the cooling inefficiency of the take-off plate. It may happen that due to the imperfect contact between the hot molded article and the cooling tube, the temperature of the molded article held by the take-off plate may vary across the plate. According to the present invention, the temperature sensors located in the take-off plate or the cooling frame can be used to provide information to a cooling control unit that varies the amount of cooling fluid directed to each preform.

The adaptive cooling approach mentioned so far is also beneficial because it can take into account the fact that the temperature pattern of the molded preforms can vary during the day, the function of the specific resin used, the function of the machine settings, or due to local variations in the thickness of the preforms caused by improper valve stem actuation in the hot runner nozzle or due to uneven core shift in the mold cavities. These situations are neither predictable nor easy to fix; however, the present invention provides a mechanism to tune the post-molding cooling step for each cavity based on the temperature of each molded article or preform.

A significant reduction of the cycle time for the benefit of increasing the post molding cooling time can be achieved by simplifying the design and the movements of the take-off plate and the cooling frame. This has to take into account very critical assembling, servicing and operation constraints such as rigidity, movement accuracy, alignment between the cooling pins and the molded articles or preforms on the take-off-plate and vibrations. Also the location of the cooling frame with the pins has to be decided in such a manner to reduce the "foot print" of the entire machine.

Figure 13A:
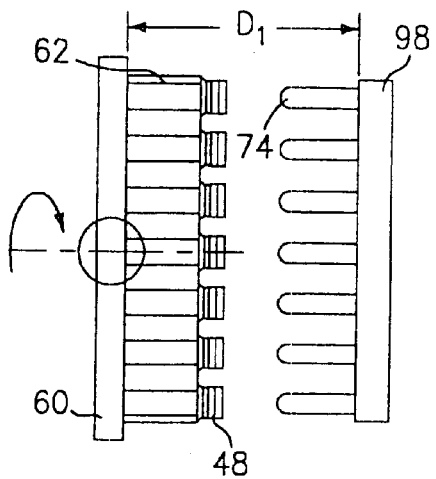
FIGS. 13(a) and 13(b) are side views of another embodiment of the cooling system of the present invention.
Figure 13B:
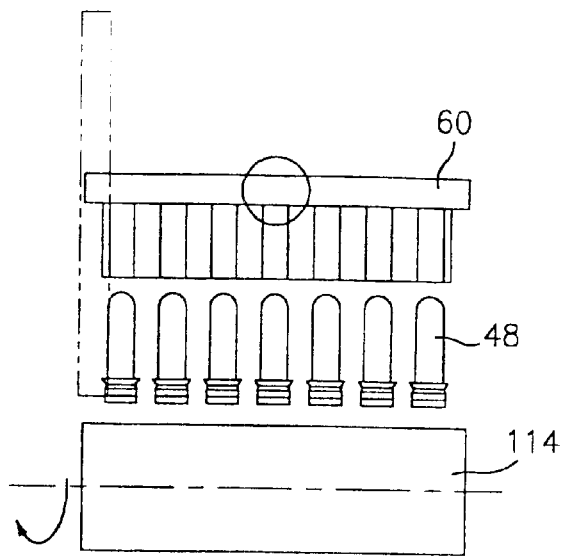

Reference is made in this regard to FIGS. 13(a) and 13(b) which show another embodiment of the present invention where the take-off plate 60 remains in a vertical position during the additional air cooling step, i.e. parallel to the mold plates 32, 26. The cooling frame 98 is translated towards the take-off plate 60 and the cooling pins 74 enter the molded articles or preforms 48. After all the preforms are cooled, the cooling frame 98 is retracted, the take-off plate 60 is rotated at 90° and parallel to a conveyor 114 and then the cooled preforms are removed from the plate 60. This approach simplifies the design of the cooling frame which does not need rotation means and means to prevent its interference with the preforms ejected from the plate.

Figure 14:
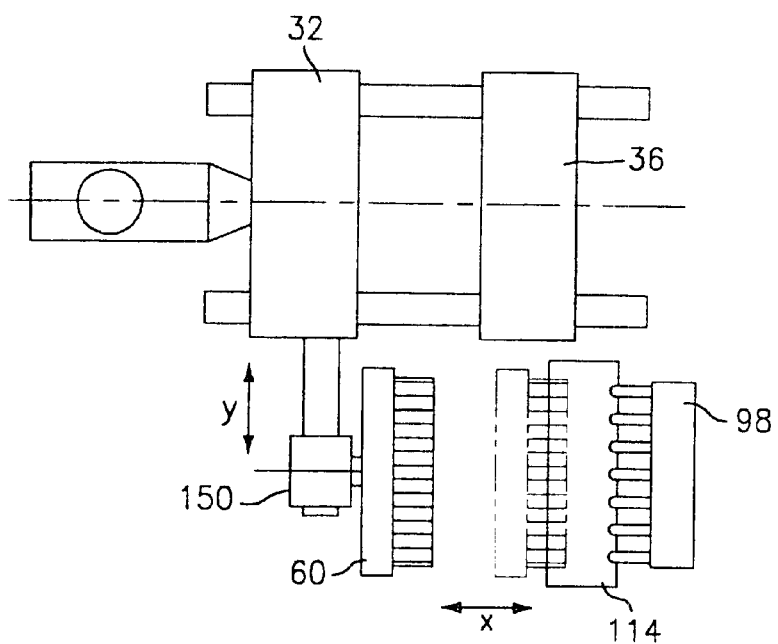
FIG. 14 is a top view of an injection molding system having another embodiment of the cooling system of the present invention.

Further reference is made to FIG. 14 which shows another embodiment of the invention where the robot take-off plate 60 comprises additional translation means 150 to move the performs 48 along an axis parallel to their axis of revolution. This additional movement of the preforms 48 simplifies the cooling frame 98 which remains substantially stationary during the cooling process. As shown in FIG. 14, the take-off plate 60 or other means for holding the performs is translated along the axis X towards the stationary cooling frame 98. After the cooling step, the take-off plate 60 is rotated by 90° so that it faces the conveyor 114 and thus the cooled preforms are ejected.

Figure 15:
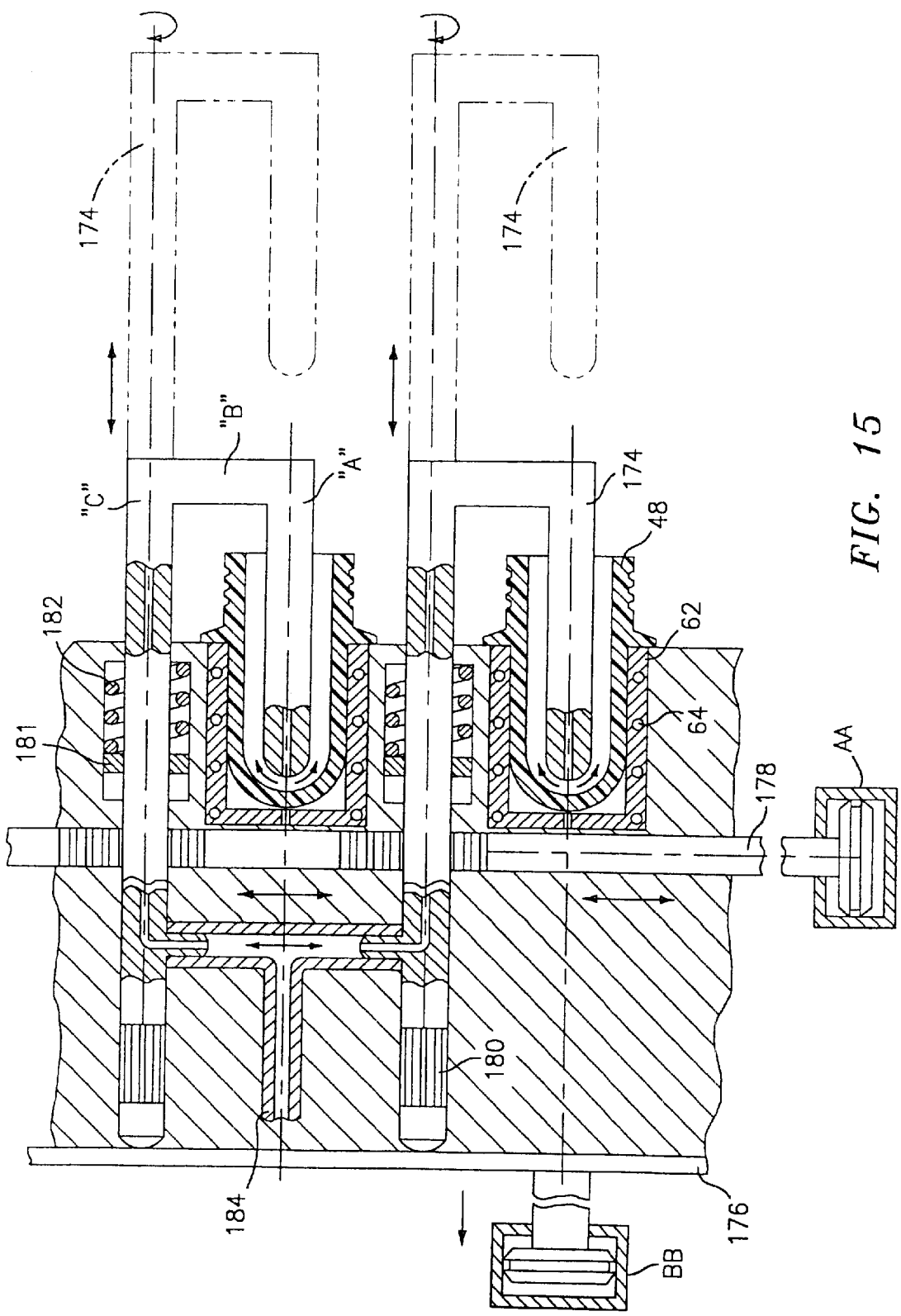
FIG. 15 is a sectional view of yet another embodiment of the cooling system of the present invention showing the mechanism for cooling the interior of the molded articles attached to the take-off-plate.

Further reference is made to FIG. 15 which shows novel air cooling means attached to the take-off-plate 60. The approach shown in this figure eliminates the need for a separate frame for holding the cooling pins and thus reduces the size of the cooling system and thus of the injection molding machine. The new cooling pins 174 have an approximate U-shape and can be moved all together parallel to the preforms 48 so that they can be introduced inside the preforms and moved out of the preforms using a thin strip 176 actuated by piston BB or any other known means. The pins 174 can be also rotated around an axis "A" parallel to the preform so that they can be brought into or removed from axial alignment with the preforms. This simultaneous rotation of all the pins 174 can be achieved using any suitable means known in the art. According to the invention, the U-shaped cooling pins 174 have an ARM "A" that enters the preform, an ARM "C" parallel to ARM "A" that is used for moving ARM "A", and an ARM "B" that connects ARM "A" to ARM "C". The rotation of the pins around the axis A of ARM "C" can be done in various ways. As shown in FIG. 15, this can be done using an elongated rack 178, operated by piston AA, that is in engagement with pinions 180 attached to the ARM "C" of each cooling pin. The same rotation can be done using frictional means, one in translation and the other in rotation. During the transfer of the preforms 48 from the cores 38 to the cooling tubes 62 of the take off plate 60, the U-shaped cooling pins 174 can be "parked" in a dedicated location located adjacent each cooling tube 62, so that they do not interfere with the moving preforms and less space is needed to open the mold. Immediately after the preforms 98 are retained in the takeoff plate 60, the cooling pins 174 attached to the plate 60 are moved forward by the piston BB and the strip 176 and when they reach a certain height which allows ARM "A" to be on top of the preform, they are rotated in axial alignment with the preforms and finally introduced inside the preforms through the retreat of the piston BB. The permanent contact between the strip 176 and each ARM "C" is provided by a coil spring 182 which operates against shoulder 181 or any other appropriate means. A flexible tube 184 is used to supply blowing air to each cooling pin through ARM "C". This design of the cooling pins attached to the take-off plate brings the following advantages: simplifies and reduces the size of the cooling system, improves the cooling rate because inside cooling starts immediately after the preforms are in the take-off plate, inside cooling can be done during the movement of the take-off plate and practically continuously for as long as the preforms are also cooled by the take-off plate. During the ejection of the cooled preforms, the cooling pins must be again rotated towards their initial position so that they are no longer aligned with the preforms.

Figure 12:
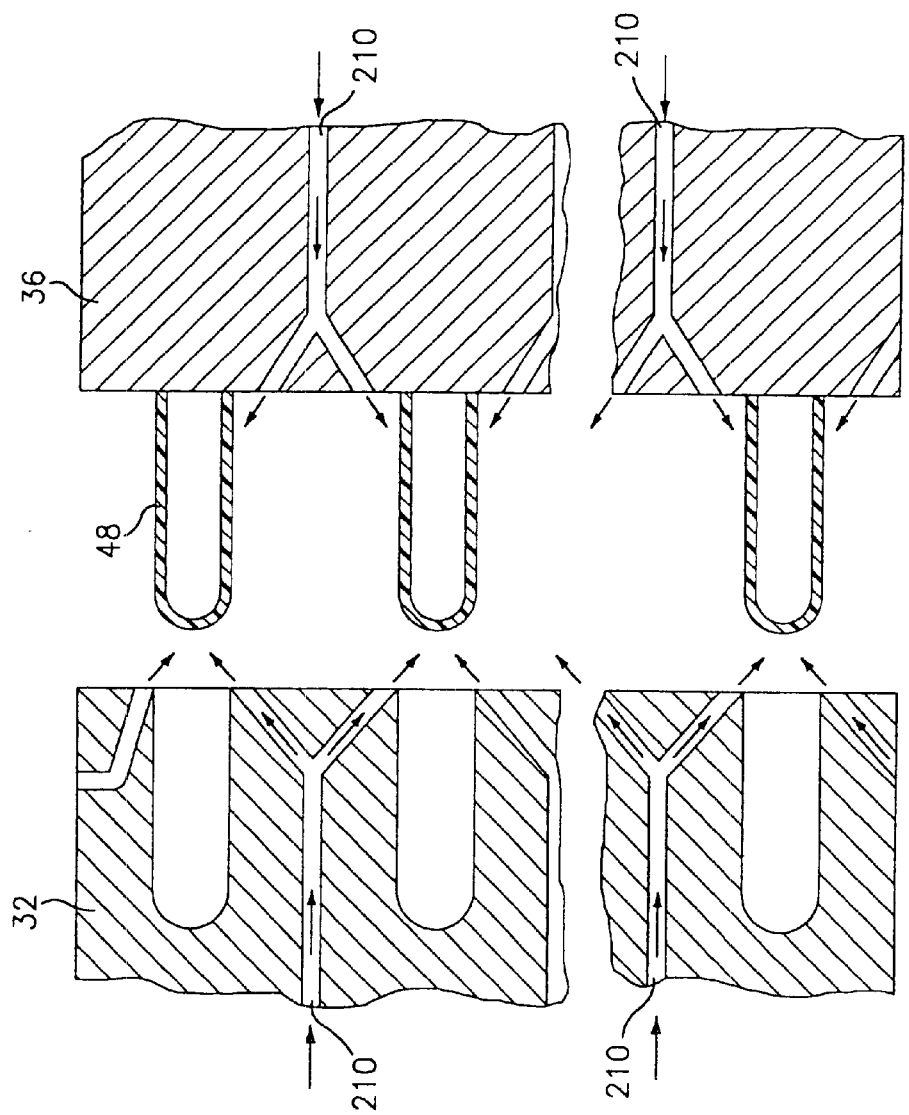
FIG. 12 is a sectional view of a system wherein air cooling channels are incorporated into the mold halves.

Further reference is made to FIG. 12 which shows air cooling means comprising cooling channels 210 incorporated in the mold halves 32, 36 that allow cooling of the preforms held by the mold cores, during and immediately after opening the mold and before the take-off plate enters the molding area. This additional cooling step will further solidify the preform before the take-off plate is brought into the mold area and before they are transferred to the take-off plate.

According to another embodiment of the present invention, that can be easily understood from other drawings in this application, the robot and the take-off plate retain only a single batch of preforms. After the injection steps, the take-off plate is parked outside the mold area and cooling air or refrigerated air is blown inside each preform from the cooling pins. The cooled preforms are ejected form the take-off plate that will be brought back into the molding area without carrying any preforms.

Figure 23:
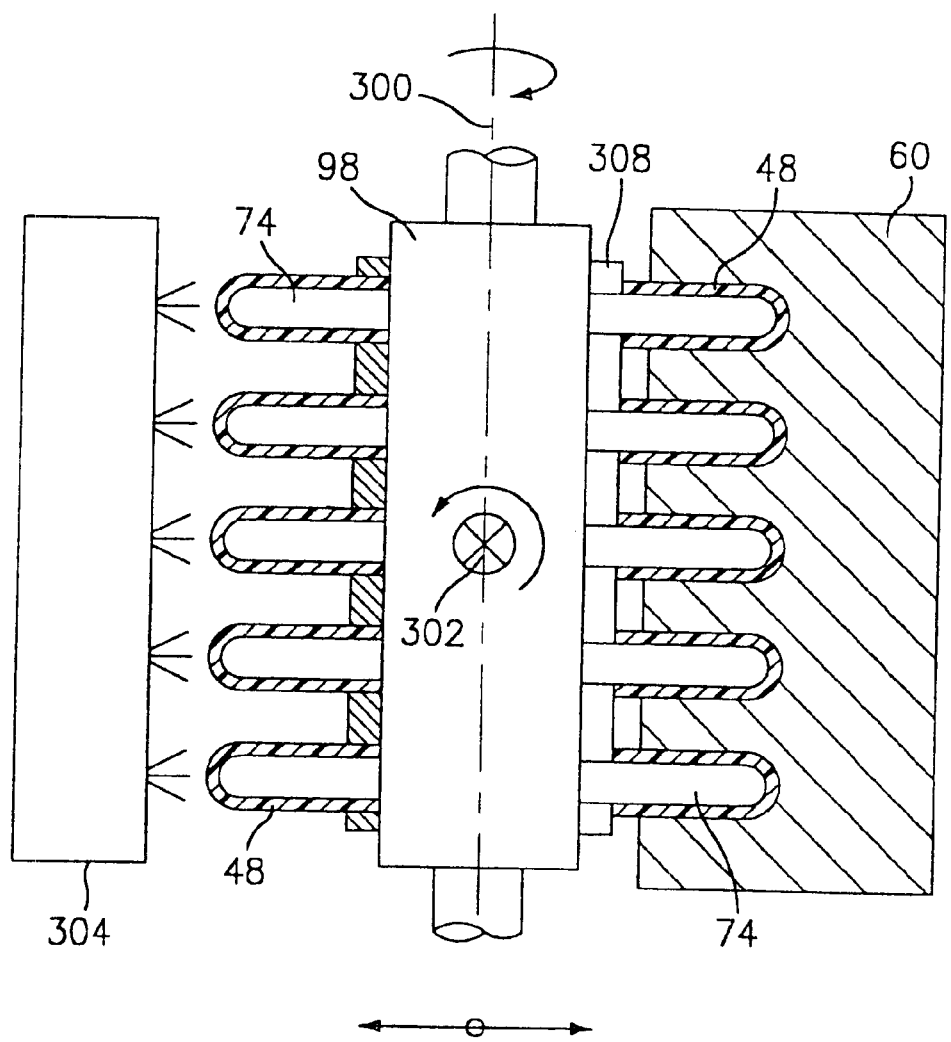
FIG. 23 illustrates an alternative frame construction with cooling pins on multiple surfaces of the frame.

FIG. 23 illustrates an alternative construction of the frame 98 for holding the cooling pins 74. As shown in this figure, the frame 98 may have cooling pins 74 on two opposed surfaces. Further, the frame may rotate about a first axis 300 and a second axis 302 which is perpendicular to the first axis 300. Any suitable means (not shown) known in the art may be used to rotate the frame 98 about the axes 300 and 302.

By providing this type of construction, it is possible to have a first set of cooling pins 74 engage the preforms 48 in a take-off plate 60 and begin internal cooling of the preforms. The preforms 48 may then be transferred out of the holders 62 in the take-off plate 60 onto the pins 74. The frame 98 can then be rotated about one or more of the axes 300 and 302, while internal cooling of the preforms 48 is being carried out by the pins 74. After the first set of preforms has reached the left-hand position shown in FIG. 23, a second set of cooling pins 74 may engage a second set of preforms 48 held in the take-off plate 60. If desired, the left-hand set of preforms 48 can have their exterior surfaces convectively cooled using a cooling station 304 having a plurality of nozzles (not shown) for blowing cold air onto the exterior surfaces. If desired, the frame 98 may have a preform retaining plate 308 attached to it.

It is apparent that there has been provided in accordance with the present invention a preform post-mold cooling method and apparatus which fully satisfies the means, objects, and advantages set forth hereinbefore. It is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method to increase the number of molded articles produced by an injection molding machine per unit of time, comprising the steps of:
   removing the molded article from a mold of an injection molding machine;
   inserting a cooling means a predetermined distance into the molded article to form an inlet in the molded article and a substantially annular outlet defined by an outer surface of said cooling means and an inner surface of the molded article, at the predetermined distance the cooling means is spaced away from the molded article;
   transmitting a cooling medium from said inlet through said outlet, said inlet at a predetermined location in the molded article to reduce the time to produce a molded article for further processing.

2. The method of claim 1, wherein removing the molded article from the mold comprises placing a take-off means adjacent the molded article and transferring the molded article from the mold to said take-off means.

3. The method of claim 2, further comprising the steps of:
   removing said cooling means from the molded article; and, removing the molded article from said take-off means.

4. The method of claim 1, wherein said cooling medium is one selected from the group consisting of a gas and a liquid.

5. The method of claim 1, wherein said predetermined location is one selected from the group consisting of a neck portion, a nub/vestige portion, a dome portion, a thread portion and a crystallization forming portion.

6. A method of cooling a molded article having a first region at a relatively high heat and an adjacent region at a relatively lower heat, the method comprising the steps of:
   removing a molded article from a mold comprising mold halves, the molded article removed into a holder of an end of arm tool while said molded article retains an amount of heat, the end of arm tool being movable between (i) a first position between the mold halves where the holder receives the molded article and (ii) a second position outside of the mold;

withdrawing the end of arm tool from between the mold halves to the second position;

at a time after withdrawal of the end of arm tool to the second position, inserting a tip of a cooling pin into the molded article while the molded article is held within the holder;

forming an open system in relation to the cooling pin and the molded article, the open system comprising a substantially annular outlet defined by an outer surface of the cooling pin and an inner surface of the molded article, the open system having a passageway allowing venting of gaseous cooling fluid from an interior of the molded article to an ambient environment; and forcing a gaseous cooling fluid along an internal channel of the cooling pin, the internal channel terminating at the tip that, upon insertion into the molded article, is spaced away from the first region, the gaseous cooling fluid being expelled from the tip mostly in a direction of the first region to accentuate cooling within at least the first region, and whereby the gaseous cooling fluid is allowed to flow from the interior of the molded article and via the passageway to vent into the ambient environment.

7. The method of claim 6, wherein the open system formed by positioning the cooling pin relative to an open end of said molded article to define a space between a region of an external surface of the cooling pin and the open end of said molded article adjacent the region of the external surface, wherein the space defines the passageway.

8. The method of claim 7, wherein the gaseous cooling fluid is cooled pressurized air that is blown along the internal channel.

9. The method according to claim 8, further comprising applying cooling to exterior portions of the molded article while the molded article is held within the holder, wherein said applying cooling to exterior portions occurs either simultaneously, partially simultaneously or sequentially with the forcing of the cooling fluid along the internal channel.

10. The method according to claim 9, further comprising changing, over time, the amount of cooling fluid delivered by the cooling pin.

11. The method according to claim 10, wherein cooperation of the internal channel and the tip, when located within the molded article, focuses the cooling fluid on the first region.

12. The method according to claim 11, wherein the tip is configured to produce a divergent cooling fluid flow therefrom.

13. The method of claim 12, wherein the tip of the cooling pin is introduced into the preform to a depth that allows the coolant to reach and cool an internal dome portion of a preform.

14. The method of claim 13, further comprising: spacing the tip a first distance (d) from the first region of the molded article ; and spacing a sidewall of said cooling pin a second distance (D) from internal sidewalls of the molded article;

wherein a ratio of d: D is in the range of about 1:1 to about 10:1.

15. A method of cooling a molded article having a gate portion, the method comprising the steps of:

removing a molded article from a mold comprising mold halves, the molded article removed into a holder of an end of arm tool while said molded article retains an amount of heat;

withdrawing the end of arm tool front between the mold halves;

at a time immediately following withdrawal of the end of arm tool from between the mold halves, inserting a tip of a cooling pin into the molded article while the molded article is held within the holder;

forming an open system by positioning the cooling pin relative to an open end of said molded article to define an annular space between a region of an external surface of the cooling pin and the open end of said molded article adjacent the region of the external surface, the space allowing venting of gaseous cooling fluid from an interior of the molded article to an ambient environment; and forcing a gaseous cooling fluid along an internal channel of the cooling pin, the internal channel terminating at the tip that, upon insertion into the molded article, is spaced away from the gate portion, the gaseous cooling fluid expelled from the tip mostly in a direction of the gate portion to accentuate cooling within at least a region of the molded article surrounding the gate portion, and whereby the gaseous cooling fluid is allowed to flow, in use, from the interior of the molded article to vent into the ambient environment from the space at the open end of the molded article.

16. The method of claim 15, further comprising: spacing the tip a first distance (d) from the gate portion of the molded article; and spacing a sidewall of said cooling pin a second distance (D) from internal sidewalls of the molded article;

wherein a ratio of d: D is in the range of about 1:1 to about 10:1.

17. The method of claim 16, wherein the gaseous cooling fluid is cooled pressurized air that is blown along the internal channel.

18. The method of claim 17, further comprising applying cooling to exterior portions of the molded article while the molded article is held within the holder, wherein said applying cooling to exterior portions occurs either simultaneously, partially simultaneously or sequentially with the forcing of the cooling fluid along the internal channel.

19. The method of claim 18, further comprising changing, over time, the amount of cooling fluid delivered by the cooling pin.

20. The method of claim 19, wherein cooperation of the internal channel and the tip, when located within the molded article, focuses the cooling fluid on a region principally surrounding the gate portion.

21. A method for cooling a plurality of molded articles, comprising the steps of;

separating the plurality of molded articles from a mold cavity device;

inserting the plurality of molded articles into an exterior cooling device, said exterior cooling device including an array of cooling cavities, each cooling cavity having a plurality of cooling fluid passageways configured to cool an exterior surface of a respective molded article;

cooling the exterior surfaces of the plurality of molded articles after they have been removed from a mold cavity device, using the exterior cooling device; and inserting an interior cooling device into an interior of the plurality of molded articles, said interior cooling device including an array of cooling cavity pins, each cooling pin having (i) an interior cooling fluid passageway configured to supply cooling fluid to a distal end of said each cooling pin, and (ii) a cooling fluid exit, in fluid communication with said cooling fluid passageway, for directing cooling fluid at an interior surface of a portion of the respective molded article, an annular space being formed between an external surface of each interior cooling device and an open end of a corresponding molded article, upon insertion into the molded article each interior cooling device is spaced away from the corresponding molded article; and cooling interior surfaces of the plurality of molded articles, said interior cooling device supplying the cooling fluid to said cooling fluid exit at a time when said exterior cooling device is cooling the exterior surface of the respective molded article.

22. A method according to claim 21, wherein said plurality of cooling cavities conductively cool respective exterior surfaces of the plurality of molded articles.

23. A method according to claim 21, wherein said plurality of cooling pins convectively cool respective interior surfaces of the plurality of molded articles.

24. A method according to claim 21, wherein each said cooling pin provides an annular cooling fluid flow over the interior surface of the respective molded article.

25. A method according to claim 21, wherein said interior cooling device moves with respect to the mold cavity device.

26. A method according to claim 21, wherein said exterior cooling device moves with respect to said interior cooling device.

27. A method according to claim 21, wherein each said cooling pin does not contact the interior surface of said respective molded article.

28. A method according to claim 21, wherein each said cooling cavity contacts substantially the entire outer surface of said respective molded article.

29. A method according to claim 21, wherein each said cooling pin has an interior cooling fluid exit channel that permits cooling fluid to exit from an interior of said respective molded article through an interior of said each cooling pin.

30. A method according to claim 21, further comprising the step of providing cooling fluid to each said cooling pin to cause cooling of a tip of said respective molded article at a rate which prevents substantial crystallinity formation in said tip.

31. A method according to claim 24, wherein said cooling fluid comprises pressurized air.

32. A method of cooling a molded article having a first region at a relatively high heat and an adjacent region at a relatively lower heat, the method comprising:

removing a molded article from a mold comprised from mold halves, the molded article removed into a holder of an end-of-arm tool while said molded article retains an amount of heat, the end-of-arm tool operational between a first position between the mold halves where the holder receives the molded article and a second position outside of the mold;

withdrawing the end-of-arm tool from between the mold halves to the second position;

at a time after withdrawal of the end-of-arm tool to the second position, inserting a tip of a cooling pin into the molded article while the molded article is held within the holder;

forming an open system in relation to the cooling pin and the molded article, the open system having a passageway allowing venting of gaseous cooling fluid from an interior of the molded article to an ambient environment, the open system formed by positioning the cooling pin relative to an open end of said molded article to define a space between a region of an external surface of the cooling pin and the open end of said molded article adjacent the region of the external surface, wherein the space defines the passageway; and forcing a gaseous cooling fluid along an internal channel of the cooling pin, the internal channel terminating at the tip that, upon insertion into the molded article, is spaced away from the first region, the gaseous cooling fluid expelled from the tip mostly in a direction of the first region to accentuate cooling within at least the first region, and whereby the gaseous cooling fluid is allowed to flow from the interior of the molded article and via the passageway to vent into the ambient environment and wherein cooperation of the internal channel and the tip, when located within the molded article, focuses the cooling fluid on the first region.

33. The method of cooling a molded article according to claim 32, wherein the gaseous cooling fluid comprises cooled pressurized air that is blown along the internal channel.

34. The method of cooling a molded article according to claim 32, further comprising applying cooling to exterior portions of the molded article while the molded article is held within the holder, wherein said applying cooling to exterior portions occurs at one of (i) simultaneously, (ii) partially simultaneously, or (iii) sequentially with the forcing of the cooling fluid along the internal channel.

35. The method of cooling a molded article according to claim 32, further comprising changing, over time, the amount of cooling fluid delivered by the cooling pin.

36. The method of cooling a molded article according to claim 32, wherein the tip is configured to produce a divergent cooling fluid flow therefrom.

37. The method of cooling a molded article according to claim 32, wherein the tip of the cooling pin is introduced into the preform to a depth that allows the coolant to reach and cool an internal dome portion of a preform.

38. The method of cooling a molded article (48) according to claim 37, further comprising:

spacing the tip a first distance from the first region of the molded article; and spacing a sidewall of said cooling pin a second distance from internal sidewalls of the molded article;

wherein a ratio of the first distance to the second distance is in the range of about 1:1 to about 10:1.

39. The method of cooling a molded article according to claim 32, further comprising:

at a predetermined time, terminating the forcing of the gaseous cooling fluid along the internal channel of the cooling pin; and initiating a vacuum function with respect to the pin to cause holding of the preform on the pin to support extraction of the preform from the holder.

* * * * *